United States Patent [19]

Thirion et al.

[11] Patent Number: 5,421,330
[45] Date of Patent: Jun. 6, 1995

[54] METHOD AND DEVICE FOR EXAMINING A BODY, PARTICULARLY FOR TOMOGRAPHY

[75] Inventors: Jean-Philippe Thirion; Nicholas Ayache, both of Paris, France

[73] Assignee: Inria Institut National De Recherche En Informatique et en Automatique, Le Chesnay, France

[21] Appl. No.: 960,419
[22] PCT Filed: Mar. 19, 1992
[86] PCT No.: PCT/FR92/00252
  § 371 Date: Dec. 23, 1992
  § 102(e) Date: Dec. 23, 1992
[87] PCT Pub. No.: WO92/20032
  PCT Pub. Date: Nov. 12, 1992

[30] Foreign Application Priority Data

Apr. 25, 1991 [FR] France .................... 91 05138

[51] Int. Cl.⁶ ............ A61B 5/00; G01T 1/00; G06K 9/20
[52] U.S. Cl. ............. 128/653.1; 250/363.04; 364/413.14; 364/413.19; 378/901; 382/128
[58] Field of Search ........... 128/653.1; 378/4, 901; 250/363.01, 363.04; 364/413.14, 413.15, 413.16, 413.17, 413.19; 382/6, 22, 41

[56] References Cited

U.S. PATENT DOCUMENTS

| | | | |
|---|---|---|---|
| 3,924,129 | 12/1975 | LeMay | 250/336 |
| 4,038,551 | 7/1977 | LeMay | 250/445 T |
| 4,114,042 | 9/1978 | LeMay | 250/445 T |
| 4,233,662 | 11/1980 | LeMay | 364/414 |
| 4,873,632 | 10/1989 | Logan et al. | 364/413.19 |
| 4,903,204 | 2/1990 | Dobbins, III | 378/901 |
| 5,032,728 | 7/1991 | Chang et al. | 250/363.04 |
| 5,170,439 | 12/1992 | Zeng et al. | 382/6 |

OTHER PUBLICATIONS

Ballard et al., "Early Processing," *Computer Vision*, Chapter 3, pp. 63–11.
Kass et al., "Snakes Active Contour Models," *International Journal of Computer Vision*, 1988, pp. 321–331.
Lim, "Image Enhancement," *Digital Images Processing Techniques*, Chapter 1, 1984, pp. 1–49.
Lefkopoulos, "Evolution Methodologique Vers La Dosimetrie 3–D En Vue De L'Optimisation Des Irradiations Intracraniennes En Conditions Stereotaxiques," Jun. 1989, pp. 1–84.
Vaillant, "Geometrie Differentielle Et Vision Par Ordinateur: Detection Et Reconstruction Des Contours D'Occultation De La Surface D'Un Objet Non–Polyedrique," 1990, pp. 1–213.

*Primary Examiner*—Krista M. Pfaffle
*Attorney, Agent, or Firm*—Foley & Lardner

[57] ABSTRACT

An apparatus for assisting with examining a body emitting wavebeams includes sensors to collect wavebeams along a plurality of respective axes termed "acquisition lines" and to transform the collected wavebeams into signals defining an image of projections of at least part of the body. The signals represent the intensity of the wavebeams. Differences between selected ones of the signals relative to the axis parameters are determined. Each jump in the intensity of the signals determines a critical point corresponding to an acquisition line tangential to a boundary of the body. The axis parameters of the critical points identify a position of at least one portion of the boundary.

22 Claims, 13 Drawing Sheets

Image of projections    Scanning Device

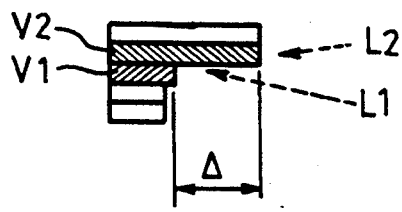
FIG.6A
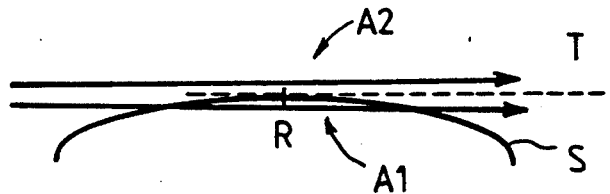
FIG.6B
FIG.7
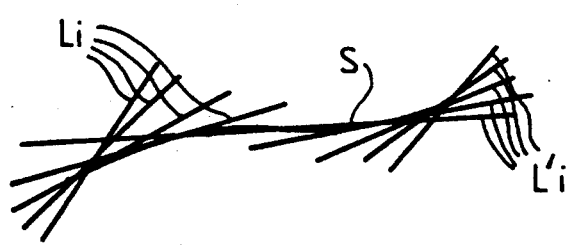
FIG.9
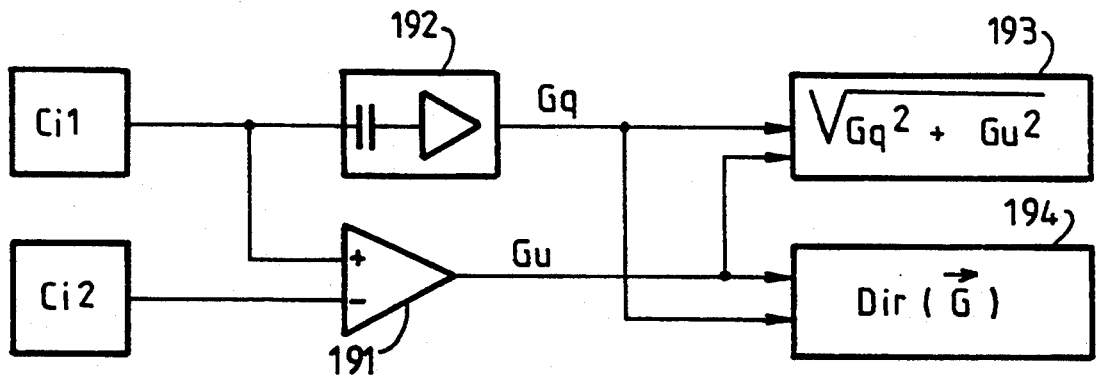

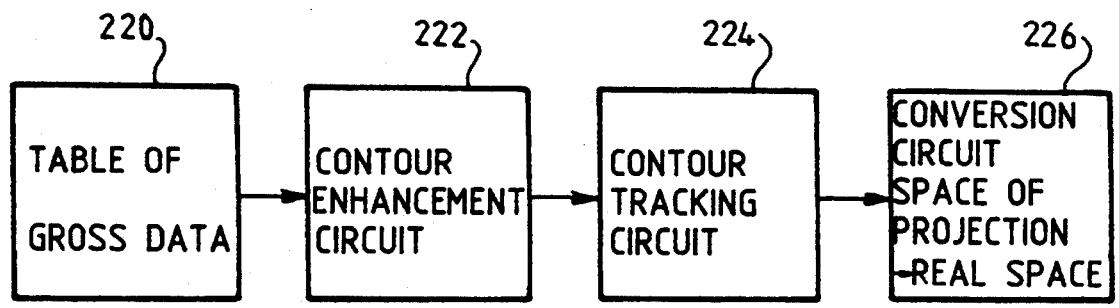
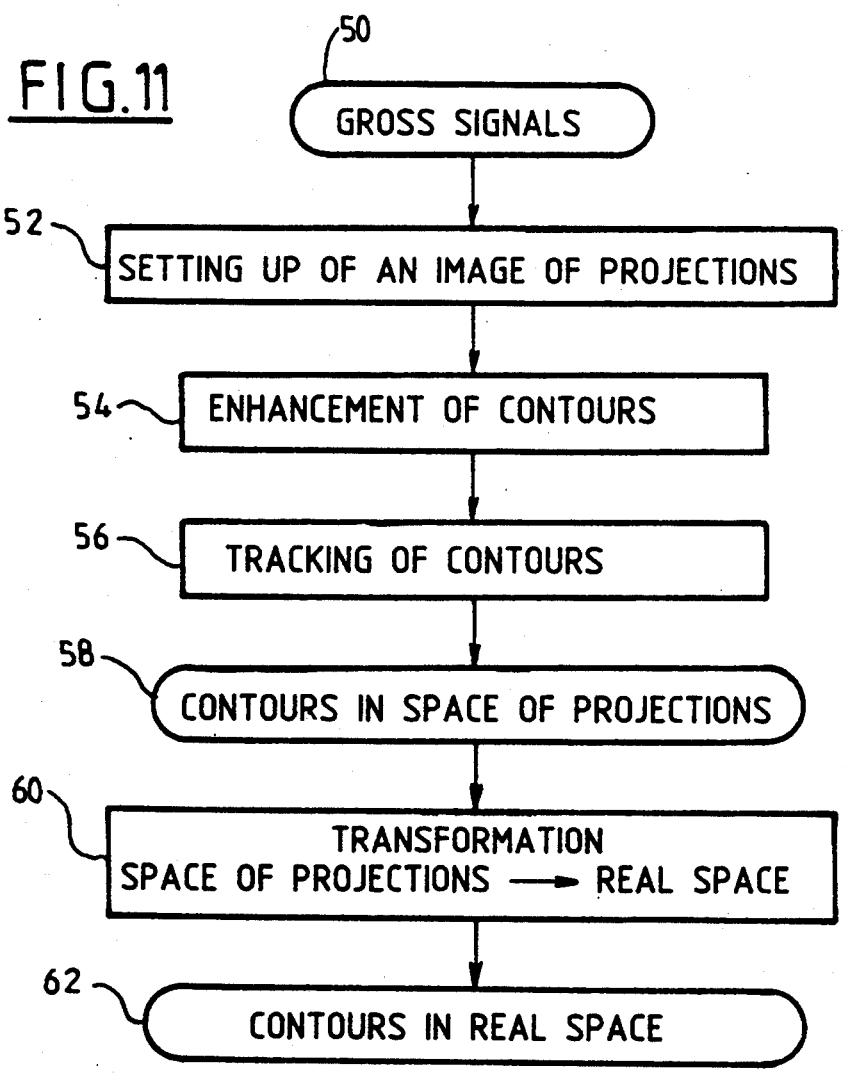

SPACE OF PROJECTIONS

REAL SPACE

Instant t-dt → Instant t

METHOD AND DEVICE FOR EXAMINING A BODY, PARTICULARLY FOR TOMOGRAPHY

BACKGROUND OF THE INVENTION

1. Field of the Invention

The invention concerns the examination of a body, by means of wave beams emerging therefrom. It applies more particularly, but not exclusively to tomography.

2. Related Art

The current embodiments in the field concern what may be termed "computed tomography" (see for example, the French Patent No. 74 14031 published under No. 2 227 582). The body to be examined is traversed by wave beams. Sensors in a specified position each receive a wave beam which emerges from the body with a specified direction. For each sensor, the sensed signals ("gross data") represent the accumulated effect of the body under radiation all along the trajectory of the wave beam in question.

In other words, each gross data signal represents the intensity of a wave beam of a given type which emerges from the body along an axis termed the "acquisition line". The axis in question may be designated by at least two parameters (such as a position parameter and an angular parameter). According to these axis parameters, the gross data define a "image of projections" of the radiation in a multidimensional space termed "space of projections". This is a dual space of real space (the physical observation space), because to each point of the space of projections, there corresponds a straight line and one only of real space.

Computed tomography is based on the following principle: if a sufficiently large set of gross data signals is available relating to acquisition lines passing through the body along different directions, then it must be possible to find the variation of absorption (or of emission) of the wave beam at each point of the examined body.

The drawback of computed tomography is that it requires a considerable number of calculations. It is therefore difficult and expensive to reconstitute the real image of the body in real time.

SUMMARY OF THE INVENTION

An essential object of the present invention is, on the contrary, to provide means which facilitate the use of the sensed information in real time.

A second object of the invention is to allow this sensed information to be used at the level of the image of projections, that is to say, without having to convert them necessarily into "reconstructed data" in real space.

A third object of the invention is to provide results from a restricted set of gross data, while the technique of the prior art necessitates in principle a complete knowledge of these data.

A fourth object of the invention is to provide more accurate results than before concerning the internal or external surfaces of the examined body.

The invention also aims to make possible not only the processing of absolute measurements, but also that of "differential" measurements obtained at the level of the sensors.

The invention moreover aims to allow an apparatus acting on the body to be directly controlled, in particular in real time.

The invention moreover opens a way for the dynamic tracking of objects, here again because of its potential for operating in real time.

For this purpose, the invention offers, first of all, a device for assistance with an examination of a body.

This device will acquire an ordered set of gross data signals such as defined above.

According to the invention, the processing means include means for the differential analysis of gross data signals relative to their axis parameters, to determine therein critical points where a jump in intensity of the sensed signal manifests itself. In this way, each one of these points corresponds to an acquisition line tangential to an internal (or external) boundary of the examined body. The axis parameters of the critical points then represent, as a whole, the position of at least one portion of the boundaries of the body.

Other characteristics and advantages of the invention will emerge on examining the detailed description given below and the attached drawings wherein:

BRIEF DESCRIPTION OF THE DRAWINGS

FIGS. 6A and 6B are geometrical Figures respectively illustrating a variation in intensity in the image of projections and the shape of a corresponding "characteristic surface" in real space;

FIG. 7 illustrates a "characteristic surface" S as an envelope of straight lines;

FIG. 9 is a more detailed diagram of a variant in the acquisition of the gross data, in accordance with the present invention;

FIG. 10 is a more detailed diagram of a device for direct geometrical tomography according to the present invention;

FIG. 11 is a diagram showing the steps of the direct geometrical tomography method according to the invention;

DESCRIPTION OF THE PREFERRED EMBODIMENTS

Figure 1:
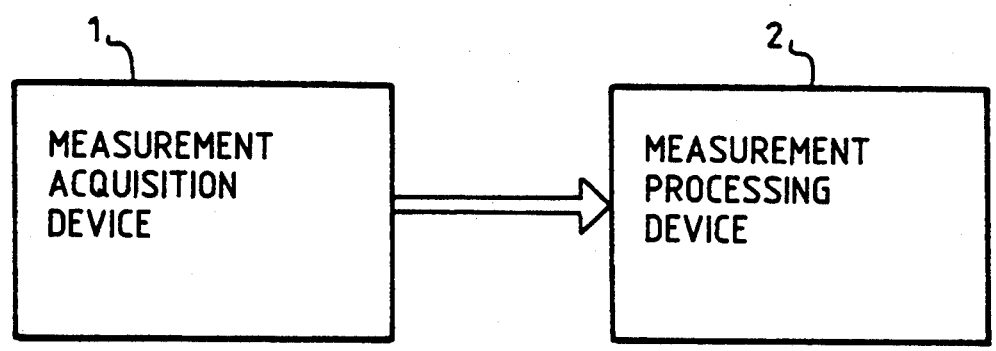
FIG. 1 is the general layout diagram of a tomography apparatus.

The attached drawings are in essence of a definitive nature. They are therefore to be considered as being incorporated in the description and can therefore serve not only to complete the latter, but also to contribute to the definition of the invention, if required.

Similarly, the documents cited below shall also be considered as incorporated in the description, in particular as examples of obtaining particular functions.

The present invention thus concerns an apparatus and a method for determining internal and external surfaces of a body examined by means of wave beams.

The object of the known proposals (such as that described in the Patent No. 74-14031) is the construction of a digital image representing the variation in the absorption or emission of wave beams inside the examined body. Their name of "computed tomography" is sometimes shortened to "CT".

The work "DIGITAL IMAGE PROCESSING TECHNIQUES", of Michael P. EKSTROM, Computational Techniques, 1984, Academic Press, theoretically describes in Chapter 4 various techniques that are useful in computed tomography.

The present invention termed "geometrical tomography" is distinguished in that it permits a direct and very accurate determination of internal or external surfaces of the examined body termed "characteristic surfaces", wherein a significant change in the properties of the body manifests itself, and this without it being necessary to reconstruct a digital image representing the variation of the absorption inside the latter.

An acquisition apparatus (1) (FIG. 1) must be available which is constituted by a plurality of sensors measuring the gross signals. It is recalled that the latter represent the intensity of the examining beam (auscultation beam) which reaches the sensor along a precise direction.

For each sensor taken at a given instant, the position of the sensor/direction of aqcuisition pair may be likened to a straight line termed "acquisition line".

The invention uses signals obtained from such an acquisition apparatus, which signals are processed (2, FIG. 1) by means of a computer unit. The acquisition apparatus (1) is not necessarily physically incorporated in the device according to the invention. But the way the gross data are acquired has an effect on the processing according to the invention.

Several modes of embodiment may be envisaged for the acquisition apparatus. They are distinguished by the way the auscultation beams are generated and the way the sensors are disposed.

As regards the generation of auscultation beams:

in a first mode, the sensors and the source of the auscultation beams are located on a support constituting the scanning device on either side of the examined body. The auscultation beams penetrate inside the body and are absorbed according to the absorption coefficients of the substance making up the examined body. The acquisition lines are defined as the lines connecting the source to the sensors.

in a second mode of embodiment, the source of the wave beams is no longer placed outside the body, but it is the body itself that emits the wave beams. The sensors allow the intensity of these wave beams to be measured, each one along a precise direction, either by collimation (the techniques termed SPECT for SINGLE PHOTON EMISSION COMPUTED TOMOGRAPHY) or by the detection of coincident measurements for pairs of particles emitted along opposite directions (PET techniques for POSITRON EMISSION TOMOGRAPHY).

in a third mode of embodiment, the wave beams are emitted by a device outside the body and are retransmitted by the internal or external surfaces of the examined body. This is the case of a body illuminated by an external source or that of echography. The sensors measure the beams retransmitted by the body along very precise directions.

As regards the way in which the various acquisition lines are obtained:

the first way is to cause the source/sensor unit to rotate round the subject. In conventional tomography, this type of apparatus is generally called a "third generation" scanner.

the second way lies in having a ring of fixed sensors and in causing the beam source to rotate, which property characterizes the "fourth generation" scanners.

finally, when the sensors are no longer located in one plane but constitute a two-dimensional surface, the apparatus obtained is generally called a "fifth generation" scanners.

Although the invention may be applied to all these cases, it is preferable for the clarity of the description to take the simplest case: an auscultation by penetrating radiation; a unidimensional sensor system.

Figure 2:
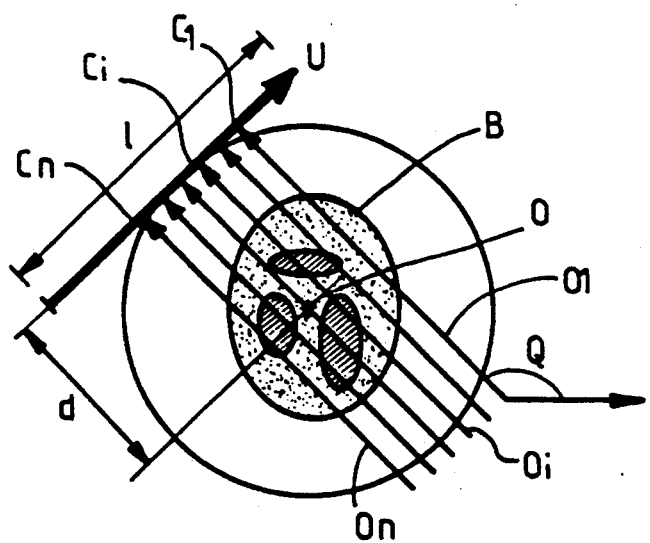
FIG. 2 is the operating diagram of a unidimensional acquisition apparatus with parallel waves.

FIG. 2 illustrates an example of the embodiment of the acquisition apparatus in the case where parallel wave beams $O1 \ldots Oi \ldots On$ are emitted which traverse the body B in a straight line to reach sensors $C1 \ldots Ci \ldots Cn$ placed in line over a section of a straight line of length 1 situated at a distance d from the centre O of the apparatus. In practice, the beams of parallel waves $O1 \ldots Oi \ldots On$ are often constituted by a single beam of plane waves forming an angle Q with a reference direction.

This plane wave beam and the line of the sensors are in common rotation round the centre O of the apparatus. At any time, the angle Q indicates the direction of incidence of the beam, which is also the direction perpendicular to the line of sensors. Each sensor Ci is characterized by its position coordinate Ui along the line of sensors. One thus has the position coordinate Ui which depends on the sensor in question, and the angular coordinate Qi=Q, which at any time is the same for all the sensors, but varies with respect to time.

Figure 3:
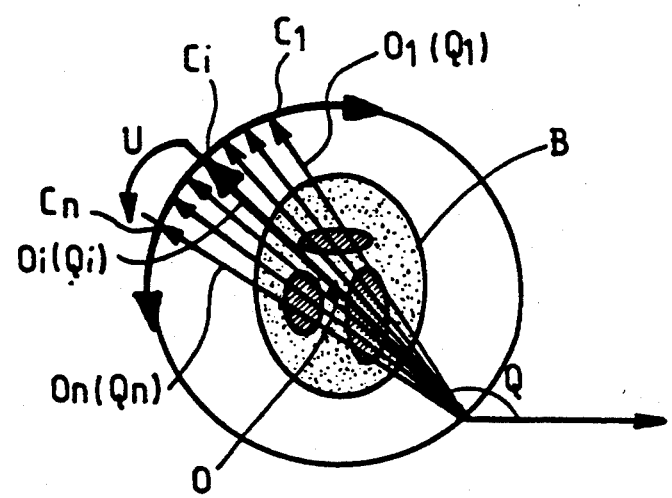
FIG. 3 is the operating diagram of a unidimensional acquisition apparatus with spherical waves.

FIG. 3 illustrates another example of the embodiment of the acquisition apparatus. This time, the various wave beams O1 ... Oi ... On are disposed in "a fan shape" and the sensors C1 ... Ci ... Cn are placed on a circular support. Each sensor is designated by its curvilinear abscissa Ui along the circular support. In practice, the fan-shaped wave beams O1 ... Oi ... On are often constituted by a single beam of spherical waves.

Figure 22:
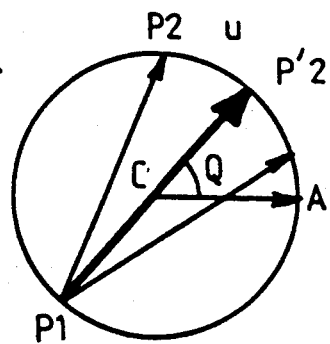
FIG. 22 is a geometrical diagram illustrating the introduction of a parameter u.

The system is movable in rotation round the centre O of the circular support. The angle Q is then taken between a reference direction and the central axis of the beam (in thick lines in the Figure), defined by the point of emission of the beam of spherical waves and by the centre of rotation of the apparatus. The coordinate of position Ui is taken, which depends on the sensor in question. The beam Oi arrives at this sensor at an angle Qi equal to Q (with Q varying with respect to time), plus a function of Ui which does not depend on time. (An example of this will be described below with regard to FIG. 22).

Other variants of the acquisition system may be easily imagined, the object of this part of the apparatus being to measure the wave intensities along the plurality of acquisition lines An important observation should be made. The parameter of angle Q has the same significance in real space and in the space of projections because it represents in the two cases the direction of the acquisition line; on the other hand, the parameter or parameters of the position of the sensors (U, V) have no direct relation with the positions (x, y) of the points considered in real space.

The apparatus according to the invention (FIGS. 4 and 10) uses differential analysis means (processing means 22) which include:

scanning means such as contour enhancement circuit (222) for determining the set of the critical points of the image of projections where a jump in intensity of the sensed signal manifests itself, it being possible for the scanning to be effected by an enhancement of the contours, or by other means, and image processing means such as contour tracking circuit (224) for subsequently determining critical contours, each formed by a continuous succession of critical points, that is to say, of critical points "joined" to form together a continuous contour (not necessarily derivable in the mathematical meaning of the term).

This continuous determination of the continuous critical contours may be effected by considering the set of critical contours by searching therein for contours meeting chosen geometrical conditions (in particular, continuity) for example, techniques termed "contour tracking".

The determination of the continuous critical contours may also be effected by using other data which are available from other sources. For example, one may compare observed critical points:

with estimated critical points obtained by another means, with models of critical points, linked or not linked, to real data.

The information or data defining these critical contours in the space of projections are forthwith sufficient for certain applications as will be seen below. However, it will often be necessary to convert the data established in the space of projections into data in real space. In certain modes of embodiment, it will also be necessary to convert data established in real space into data in the space of projections.

The invention aims to determine characteristic surfaces or "boundaries" of the examined body in real space by effecting an extraction or enhancement of the contours directly in the space of projections, subsequently a tracking of contours.

The technique here called "geometrical tomography" also effects this contour tracking directly in the space of projections.

It is profoundly distinguished from the conventional techniques which only reconstruct the surfaces of the body in real space on the basis of images obtained by computed tomography.

The present invention makes it, in particular, possible to avoid the long and expensive stage of computed tomography when the purpose is to determine the characteristic surfaces of the body rather than to obtain a digital image representing the variation of the absorption coefficients of this body.

Moreover, the invention provides position information at least as good as that of computed tomography. It affords better accuracy regarding the information for the tangent and curvature of characteristic surfaces of the body.

The following notations will be adopted:

The symbol "F" designates in principle a critical shape (line or surface) in the space of projections and "P" a point of this shape.

The symbol "S" designates in principle a characteristic surface or boundary in real space, and "R" a point of this surface.

The technique of geometrical tomography is based on the following observation, described in conjunction with FIGS. 6A, 6B and 7:

FIG. 6B shows a surface S, termed "characteristic" delimiting locally within the examined body two neighbouring zones A1 and A2 whose properties of interaction with the auscultation beams vary significantly on either side of "S". This significant variation of the properties of interaction may be a sudden index variation, a sudden variation of the absorption coefficient, a sudden variation in the quantity of the emitted or retransmitted waves for example.

Two acquisition lines L1 and L2, will be considered which have directions that are very close to each other and passing near a point R of the characteristic surface S of the examined body. If, moreover, the directions of the two acquisition lines L1 and L2 are very close to the tangent T to the surface S at point R, if finally one of these acquisition lines, for example, L1, intersects the characteristic surface S locally near the point R, while the other in this case L2, does not intersect it locally, then the two signals V1, and V2 (FIG. 6A) measured along these two acquisition lines L1 and L2 will also show a significant interspacing (delta).

The consequence of this property is that a point of the image of projections belonging to a critical contour corresponds to a straight line of real space which is tangential to a characteristic surface of the examined body. The characteristic surface S is then the envelope of the straight lines Li, L'i corresponding to the points of the critical contour (FIG. 7).

This observation is one of the foundations of the technique of geometrical tomography of the present invention. It will now be understood that the data relating to the critical contours in the space of projections are already a representation of the characteristic surfaces S sought in real space.

Figure 8A:
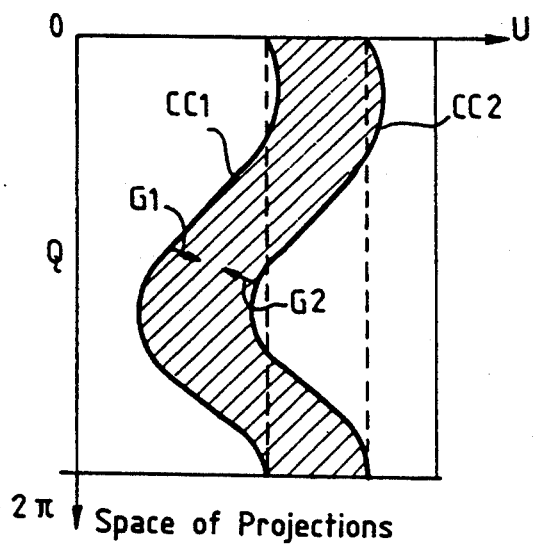
FIGS. 8A and 8B and 8C and 8D respectively show two examples of the correspondance between real space and the space of projections.
Figure 8B:
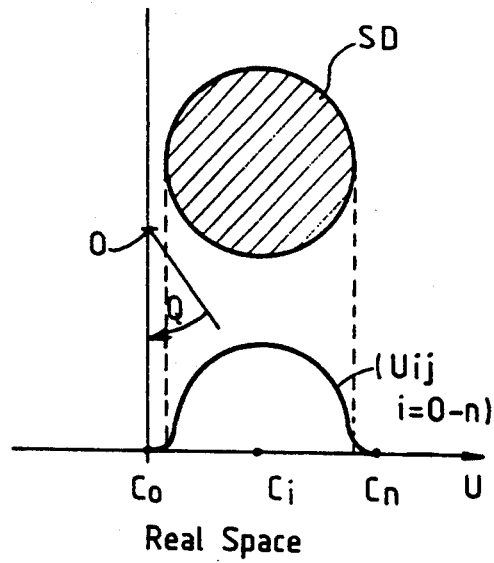

FIGS. 8A and 8B show a first example of the correspondence between real space and the space of projections for an entirely convex surface SD (a disk). In FIG. 8B (real space) the X axis designates the position U of the sensors. The curve Ui at the bottom of the Figure (which is in fact, discrete) for Q=0, Q designating the angular position of the line of sensors relative to the vertical. There follows therefrom (FIG. 8A) a band delimited by two critical contours CC1 and CC2 between the angles 0 and two pi (380° angular). The lines CC1 and CC2 are definable as functions of the form $U=f(Q)$ because to a value of Q, there corresponds a value of U and one only. FIG. 8A also shows that the gradients G1 and G2 make it possible to distinguish the interior (shaded surfaces) and the exterior.

Figure 8C:
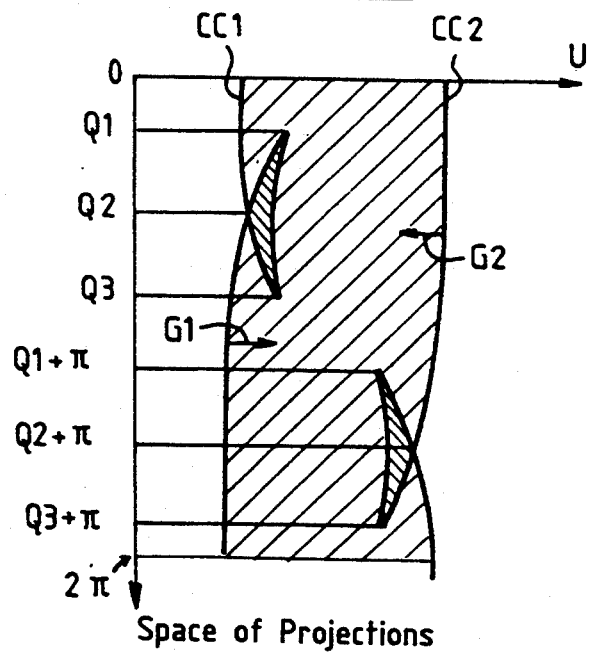
Figure 8D:
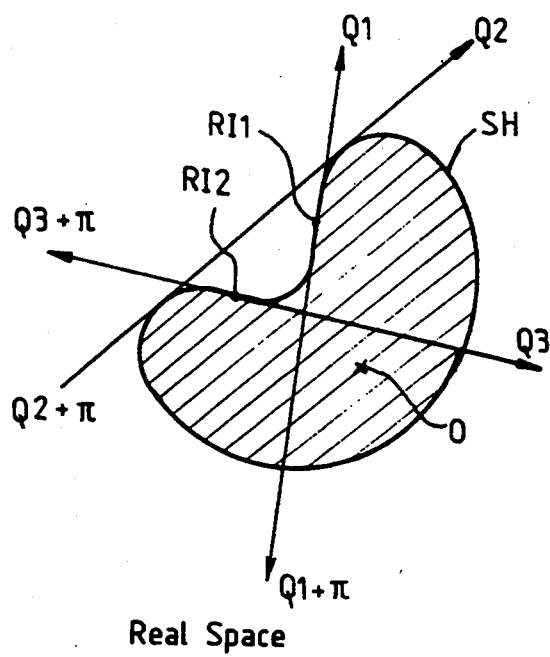

FIGS. 8C and 8D show a second example of the correspondance between real space and the space of projections for a surface with a partly concave shape SH (a kidney shape). The notations are the same as above. But:

at the level of the concavity SH, there are two points of inflection RI1 and RI2 (FIG. 8D, real space); between the angles Q1 and Q3 (and their counterparts increased by pi or 180° ) there is a double definition of U in terms of Q on the contours CC1 and CC2 (FIG. 8C), except for the crossing which appears for the angle Q2 (CC1) or Q2+pi (CC2).

According to a first general variant, the signals of the gross data are expressed in a differential form. This variant of the apparatus may lie in making provision for the enhancement of the contours inside the scanning device near the sensors.

Each sensed signal then no longer corresponds to the measurement of the intensity of the incident wave beam, but to a differential intensity measurement for a pair of neighbouring sensors or for the same sensor between two different instants.

One example of the embodiment (FIG. 9) lies in using pairs of sensors Ci1 and Ci2, each sensor pair providing two electric signals whose difference in intensity is processed by means of an operational amplifier 191 mounted as a subtractor. This type of device will be termed a "spatial differentiation device". It makes it possible to directly generate the value of the component Gu of the gradient vector of the image of projections, along the spatial direction "U" in the case of an apparatus corresponding to FIG. 2 or 3. It is not necessary to double the number of sensors; the Ci1 and Ci2 pair may be defined each time by two neighbouring sensors Ci and Ci+1.

The same would be done along the two spatial directions "U, V" by considering at least three (non-aligned) neighbouring sensors of a two-dimensional support.

In the case of sensors that are movable round the examined body, one also measures the gross signals corresponding to the derivative (or differential) with respect to time of the intensity of the wave beam received by each sensor. This is effected (FIG. 9) by means of an operational amplifier 192 mounted as a differentiator and operating for example on the sensor Ci1. This device will be termed "temporal differentiation device".

For the scanning devices operating by rotation round an axis, the temporal differentiation device is used for directly generating the signals corresponding to the gradient of the image of projections along the angular dimension Q. The scanning device may then be provided at the same time with the devices for the temporal and spatial differentiation (as in FIG. 10) so as to directly generate signals corresponding to the various components of the gradient vector (spatial-temporal) along each of the coordinates or dimensions of the multidimensional image of projections.

An additional device (193, 194) also makes it possible to transform by composition the signals corresponding to the component of the gradient along the various dimensions, into signals corresponding to the modulus of the gradient vector G and to the direction of this gradient vector G. These signals are subsequently processed in a way described below.

As for the "contour tracking", (more generally the search for critical contours), it may be conducted solely on the basis of the image of projections with enhanced contours, and/or by means of other information which is available.

This now leads to distinguishing two main modes of the embodiment of the invention: direct geometrical tomography and reciprocal geometrical tomography.

In direct geometrical tomography, the invention effects the contour tracking inside the image of projections.

The contour tracking is here the means making it possible to determine in the space of projections "critical shapes" (so-called because they may be critical lines or critical surfaces), which correspond to an estimate of the critical contours.

Once these critical shapes have been determined, the direct geometrical tomography makes provision for transforming the critical shapes of the space of projections into "reconstructed shapes" in real space, now corresponding to the characteristic surfaces of the examined body.

One may here distinguish the four operational steps set out below. Each of these operations is obtained by means of a specialised integrated circuit (FIG. 10), or by means of a programmable computer.

Figure 5:
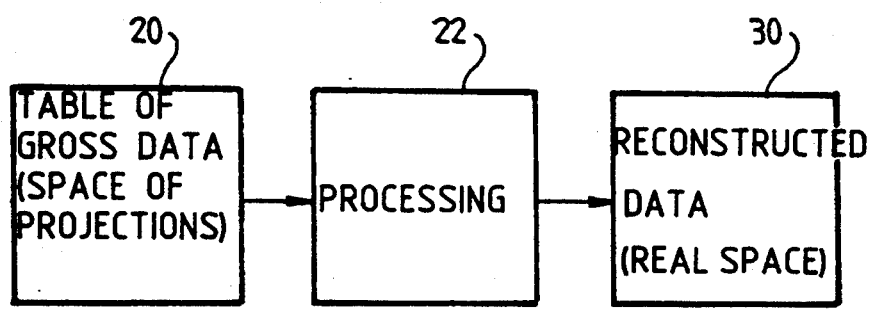
FIG. 5 is a general layout diagram of a device according to the present invention.

(a) First operation (block 20 FIG. 5, block 220 FIG. 10).

The gross signals measured at each time interval are rearranged according to the position of the sensor, and the direction of the acquisition line, at the time of acquisition.

In practice (FIG. 11) there will occur an acquisition (50) of a group of gross signals and the setting up (52) of a multidimensional table whereof each field will contain a representation of the measurement at a given moment of the intensity of the wave beam along an acquisition line: each field corresponds to an acquisition line having a different position or direction.

The technique in question does not necessarily use all the (sensed) gross signals. It is also applicable to a subset of the sensed gross signals, for example, to those belonging to a restricted vicinity round a precise point of the image of projections. By identification with its contents, this table will be called below "image of projections", although at a given moment, it may contain only a part of this image.

In the case of a scanning device according to FIG. 2 or FIG. 3, the image of projections includes a spatial dimension U corresponding to the position of the detectors along the line of detectors and an angular dimension Q which corresponds to the scanning angle.

Figure 4:
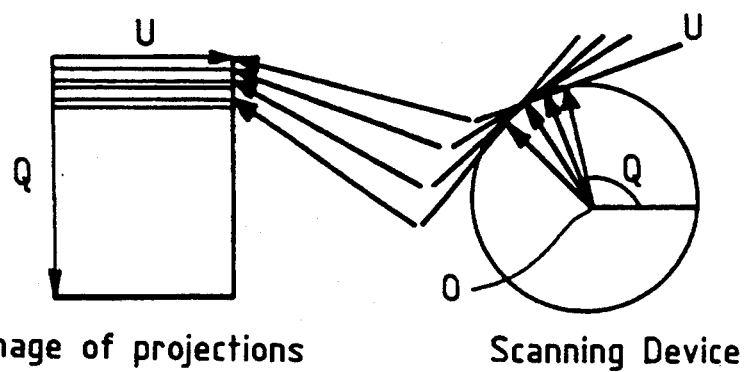
FIG. 4 is a geometrical diagram illustrating the setting up of the image of projections from unidimensional projections.

FIG. 4 shows how the image of projections is set up by the concatenation of unidimensional projections in the case of the scanning devices of FIGS. 2 and 3.

In the case of an apparatus having a two-dimensional surface supporting the sensors, the image of projections will include two spatial dimensions U, V corresponding to the position of the sensors on their supporting surface, and a dimension Q corresponding to the scanning angle.

Within a more general framework, the image of projections may include four dimensions: two spatial directions U, V and two angular dimensions Q, Z. In all cases, the multidimensional space corresponding to the image of projections will be called space of projections.

(b) Second processing operation (block 222, FIG. 10)

It relies on a device allowing an enhancement of the contours to be obtained inside the image of projections. In other words, one determines the set of critical points of the image of projections where a jump in intensity of the sensed signal manifests itself.

In practice, (block 54 FIG. 11), the contours of the image of projections are enhanced by using an enhancement technique or of contour extraction. Appropriate techniques are described for example, in:

chapter 3 "Early processing" of the work "COMPUTER VISION", Dana H. Ballard &. Christopher M. Brown, Prentice-Hall Inc., Englewood Cliffs, N.J. 07632. 1982;

Chapter 1 "Image enhancement" of the work of EKSTROM already referred to.

A particular example of contour enhancement is the computation of the gradient or of the Laplace transform of the image.

A variant is actually preferred, because it seems to give the best results. It will be described below in a complete way, with reference to FIG. 26. The "contour enhancement" part of this variant lies in passing the image of projections "IP1" to the image "IP3" with enhanced contours.

These signal processing techniques can be carried out in real time, by means of a specialised integrated circuit, or by means of a program operating on a conventional computer.

At its output, this step provides a multidimensional data table corresponding to the image of projections with enhanced contours.

Variants of this type of processing, (Chapter 3 "Early processing" already referred to) also operate on multidimensional images with more dimensions than two, which makes it possible to process the case of an image of projections with more dimensions than two.

(c) Third operation (block 224 FIG. 10).

It lies in determining within the image of projections with enhanced contours, contour lines corresponding to significant variations in the intensity of the image of projections. The contours present in the image of projections will be termed "critical contours", and the lines corresponding to the critical contours and detected by the contour tracking will be termed "critical lines".

In the case of a space of projections with more than two dimensions, the "critical lines" become "critical surfaces" which are extracted from the critical contours with a dimension $n >= 2$ within the image of projections. Below, the term "critical shape" designates indiscriminately a critical line or surface.

Here too, one may use known signal processing means; which means are termed "contour tracking" or "contour chaining" which provide at their output chained lists of the points belonging to the critical contours. Variants of this type of means exist irrespective of the dimension examined; see in particular:

Chapter 4 "Boundary detection" of the work "COMPUTER VISION" already referred to.

In practice, (block 56, FIG. 11) a contour tracking algorithm is applied in the image of projections so as to determine the lines corresponding to the critical contours in this image, that is to say, where there occurs a significant variation in intensity. (In the case of an image with more than two dimensions, one then determines critical surfaces).

The application of a global minimization technique allows the accuracy of the position of the critical lines or surfaces to be improved still further, and to "smooth" these lines or these surfaces so as to filter out the measurement noise. Such techniques are described in:

the article "SNAKES: ACTIVE CONTOUR MODELS", Michael KASS, Andrew WITKIN, and Demetri TERZOPOULOS, International Journal of Computer Vision, Vol. 1, pp. 321-331, 1987;

the publication "A FINITE ELEMENT METHOD APPLIED TO NEW ACTIVE CONTOUR MODELS AND 3-D RECONSTRUCTION FROM CROSS-SECTIONS", LAURENT D. COHEN and Isaac COHEN INRIA Research Report No. 1245, June 1990.

The critical lines or surfaces thus obtained (block 58, FIG. 11) are defined in the space of projections. In certain cases, the chained lists of points belonging to the critical contours which have been obtained are sufficient, since they already represent the characteristic surfaces of real space. However, most frequently one wishes to have a representation of the surfaces in real space, which is obtained by the fourth operation below.

(d) Fourth operation (block 226, FIG. 10).

It then lies in transforming the critical lines or surfaces obtained in the space of projections (which corresponds to the critical contours in the image of projections), into lines or surfaces of real space, which will be termed "reconstructed lines or surfaces", (which corresponds to the characteristic surfaces or "boundaries" of the examined body). This conversion step (60 FIG. 11) obtained by means proper to the invention will be described in detail below.

The processing device thus provides at the output (62, FIG. 11) a geometrical description of the characteristic surfaces or "boundaries" of the body, which may be used for the visualization, medical diagnosis, measurement of geometrical characteristics such as the measurement of length, of surface or volume of parts of the examined body, the guidance of an apparatus for constructing prostheses, the planning of surgical interventions, the guidance of an apparatus acting on the examined body, and may other applications.

Figure 16:
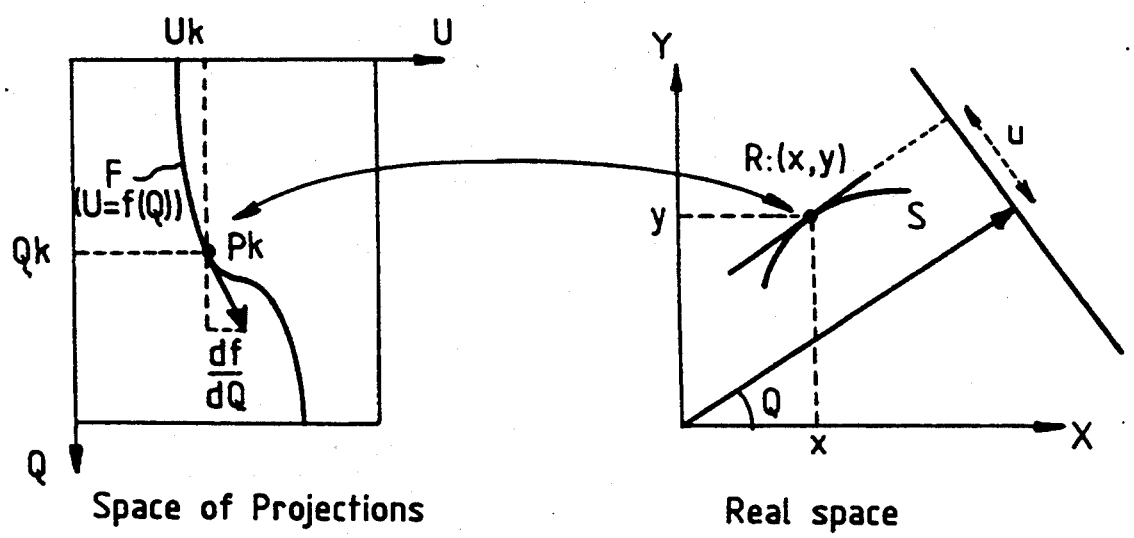
FIG. 16 is a geometrical diagram illustrating the use of such a local geometrical transformation formula.
Figure 13:
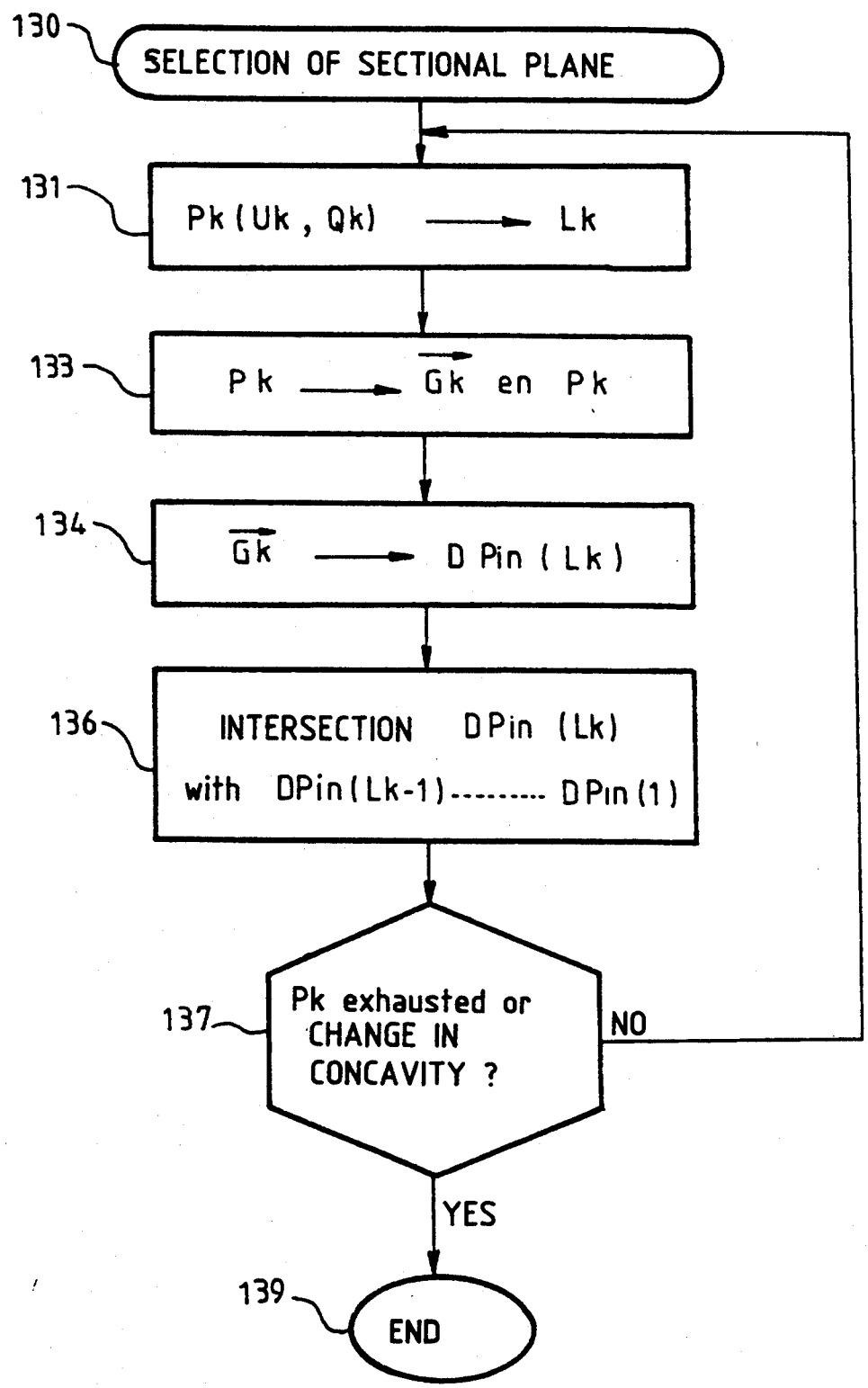
FIG. 13 is a flow chart of a technique termed "algorithmic transformation"
Figure 14:
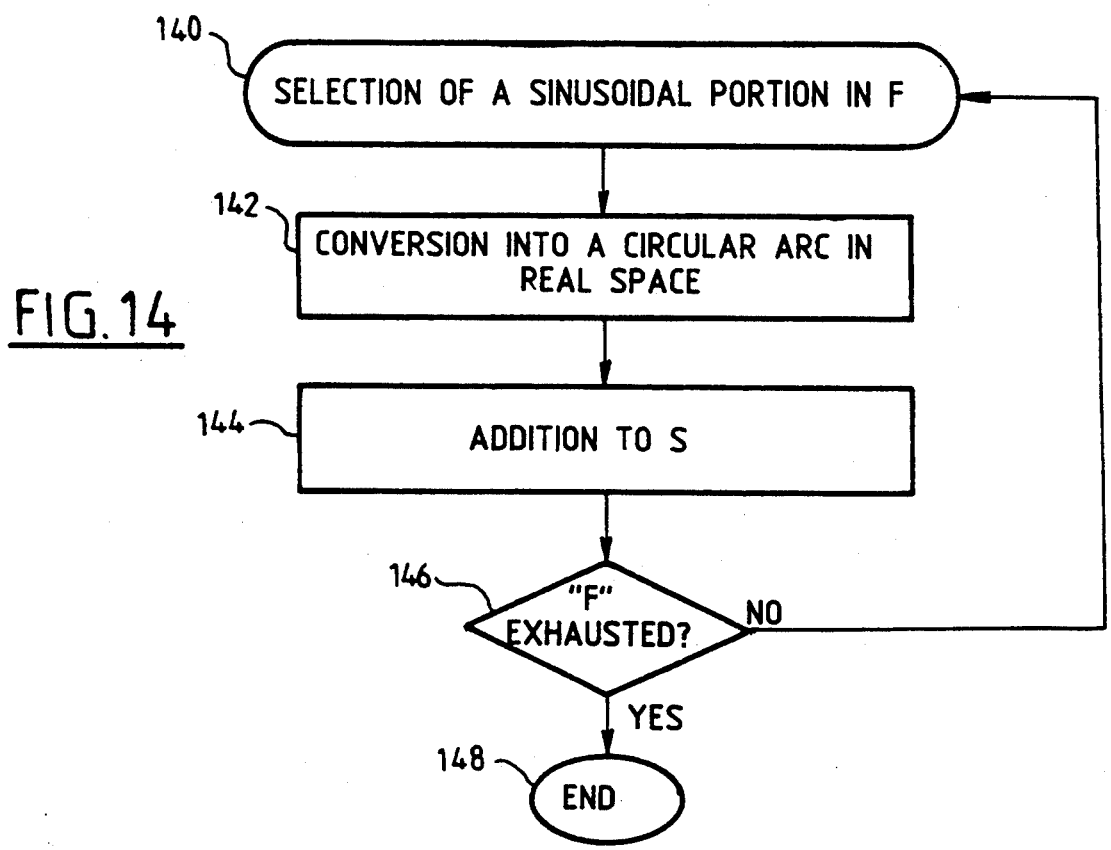
FIG. 14 is a flow chart of a technique termed "global geometrical transformation"
Figure 15:
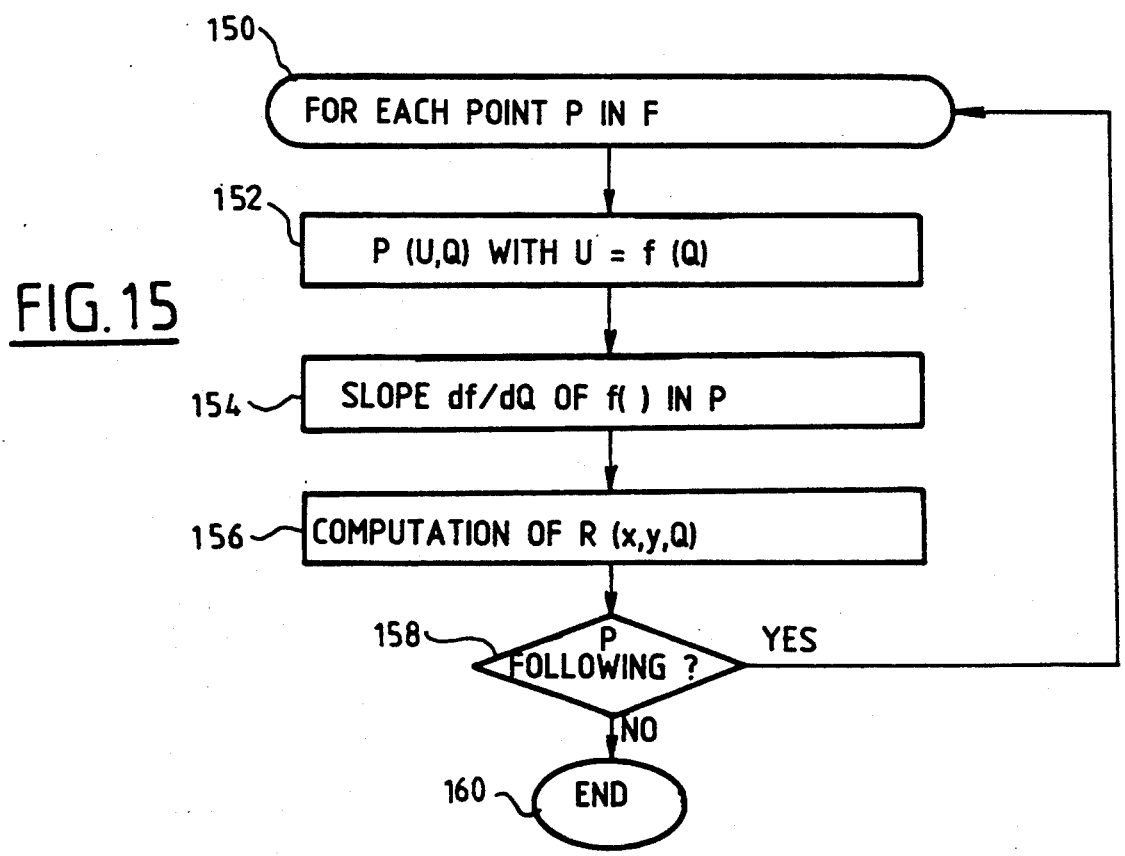
FIG. 15 is a flow chart of a technique termed "local geometrical transformation"
Figure 17:
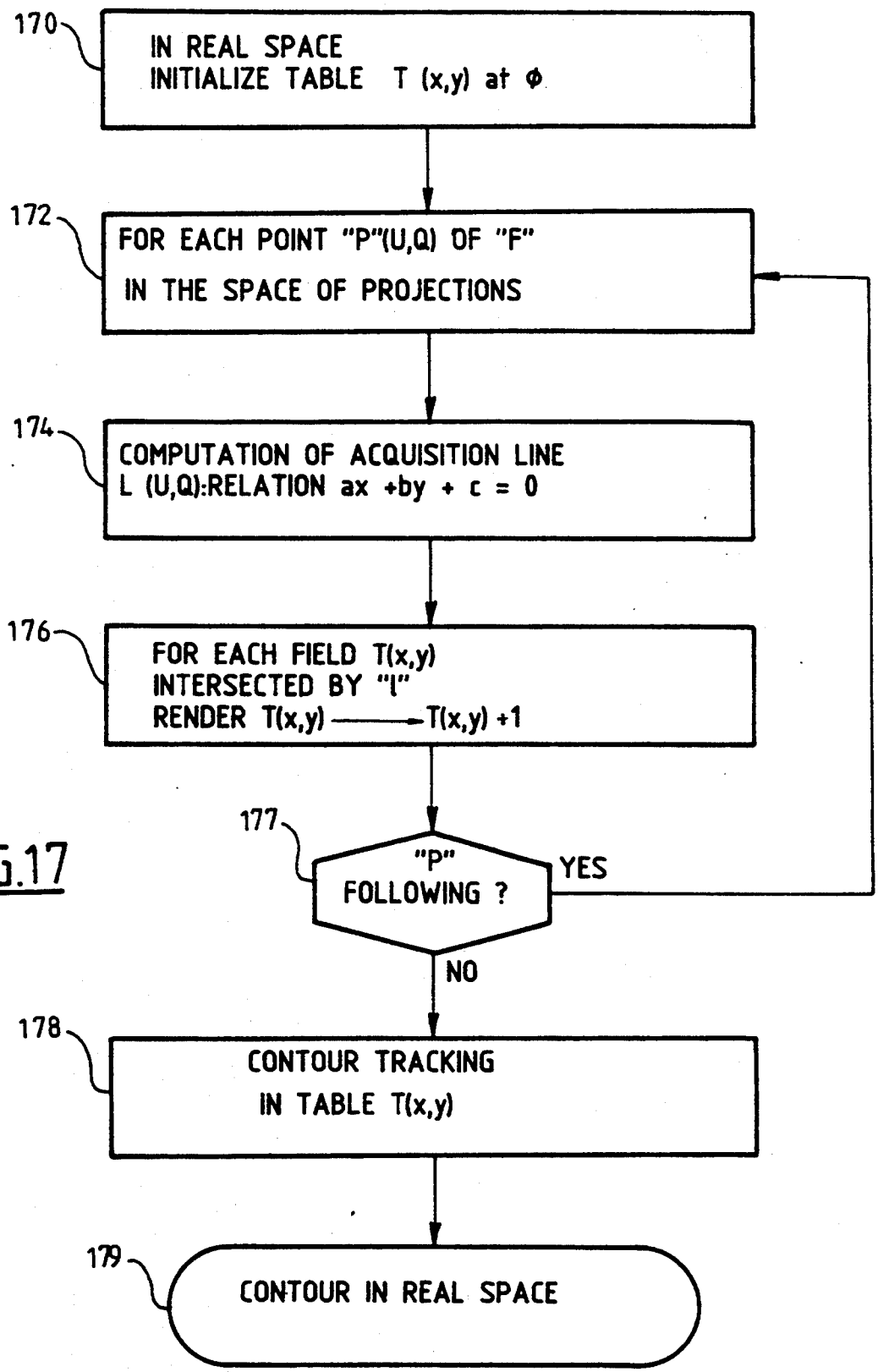
FIG. 17 is a flow chart of a technique termed "retroprojection" technique.

Several variants of this conversion (60) may be envisaged, amongst them:
a transformation termed an algorithmic transformation (FIG. 13)
a "global geometrical transformation" (FIG. 14)
a "local geometrical transformation" (FIGS. 15 and 16;
a transformation by retroprojection (FIG. 17).

The algorithmic transformation (FIG. 13) starts with the observation that a point in the space of projections corresponds to an acquisition line in real space that can be likened to a straight line and tangential to the characteristic surface which one wishes to reconstruct.

The means used lies in processing together all the critical lines belonging to the same plane in real space, termed "sectional plane" (step 130). In the case of an acquisition system of the type of that of FIG. 2 or 3, this condition is obtained for all the acquisition lines; in other cases, the information must be extracted selectively.

Figure 12:
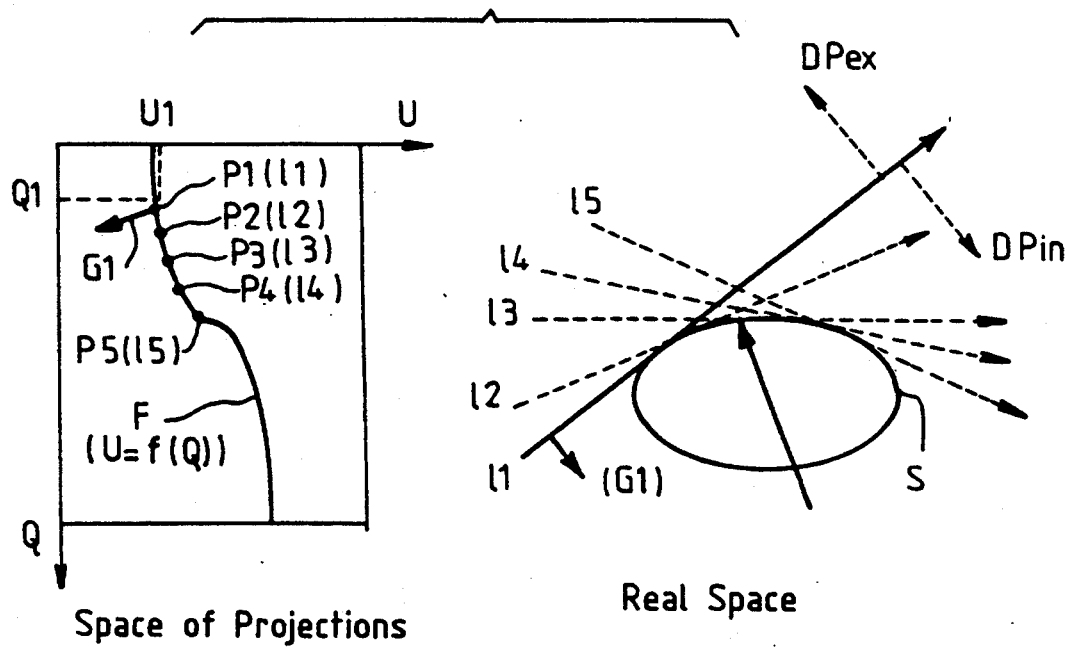
FIG. 12 is a geometrical diagram illustrating the reconstruction of a polygonal approximation of the surface by the intersection of half-planes.

The algorithmic transformation starts with a sampling of a critical line in a chained list of points Pk, illustrated in FIG. 12 for k=1 to 5. Each point Pk is designated by axis parameters Uk and Qk and there is associated therewith a gradient vector Gk.

According to the parameters Uk and Qk of the point Pk, there corresponds thereto in real space, a straight line Lk (the acquisition line), situated in the sectional plane (step 131). Because the point Pk belongs to a critical line, the straight line Lk is tangential to the characteristic surface which one wishes to reconstruct. Moreover, for each point Pk, the direction of the gradient vector Gk (determined at 133) in the image of projections makes it possible to distinguish the two half-planes delimited by the straight lines Lk in the sectional plane 134. The direction of the gradient (G1 for P1 and L1) defines one side relative to the critical line F.

There corresponds thereto in real space a side relative to the acquisition line L1. The half-plane situated on this side of L1 will be termed internal half-plane DPin, the other being termed external half-plane DPex.

The intersection of the characteristic surface S (to be reconstructed) and of the sectional plane (here considered as the plane of FIG. 12) defines a line of real space included in the sectional plane and which will be termed "characteristic line".

The means proposed for determining this "characteristic line" lies in computing polygonal lines corresponding to convex or concave portions of the characteristic lines. These polygonal lines are computed as being the contour of the intersection in a consecutive sequence of half-planes, all internal or all external (step 136). This operates (137, 139) until the list of points Pk is exhausted or up to a change in concavity, if applicable.

In the case of an acquisition system of the type of FIG. 2 or FIG. 3, every function U=f(Q) defining a critical line corresponds to an entirely convex or entirely concave portion of the surface to be reconstructed. Otherwise, U cannot be written in the form of f(Q): to the same angle Q, there will correspond several values of U; but it is possible to divide such a contour into portions whereof each is either entirely concave or entirely convex (see for example, the "kidney" of FIGS. 8C and 8D).

The geometrical transformation termed the global geometrical transformation will now be described (FIG. 14).

It lies in finding (at least locally) an analytical formulation of the critical shapes in the space of projections, for which the mathematical transformation in real space is known.

In the case of a two-dimensional image U, Q provided by an apparatus (according to FIG. 1) an example of the embodiment lies in dividing (140) a critical line F into sinusoidal portions of the form:

$$u = a + b \cos(q + d),$$

for it is known that this sinusoidal portion of the space of projections admits as transform (142) in real space a portion of the circle of radius a and centre (b,d) in polar coordinates.

Thus one reconstructs (144) the lines corresponding to the critical surfaces of the body in the form of a succession of circular arcs until the whole critical shape F in question has been processed (146 and 148).

One means for determining the sinusoidal portions approximating to the critical contour is to use Hough's method (see Chapter 4 of the work COMPUTER VISION already referred to, in particular paragraph 4.3) for sinusoids, from the image of projections.

The local geometrical transformation will now be described (FIG. 15 with the example of FIG. 16).

This transformation makes it possible to determine for each point P of a critical shape F of the space of projections (150), a point R of real space belonging to the corresponding characteristic surface.

This transformation will depend on the characteristics of the space of projections. The transformation formula allows the coordinates of the point R to be deduced in real space from the coordinates of point P in the space of projections, and from the differential characteristics of the shape F at point P. In FIG. 15 one allows (152) that U=f(Q).

The formula will be obtained by considering an infinitesimal displacement round the point P belonging to a critical shape F in the space of projections. The point and the displaced point correspond to two acquisition lines in real space. In the case where these straight lines are coplanar, the point R is the intersection of these two straight lines when the value of the displacement tends towards 0. The coordinates of the point R are computed by a limited development of F round the point P. The simplest form is the slope of the function f(Q) at point P (block 154). The step 156 deduces therefrom the coordinates (x,y) of the point R of the characteristic surface S in real space.

This is repeated (158) for all the points of F.

The same technique allows differential characteristics of S to be obtained at point R, such as the tangent, the normal, the curvature, in particular, by means of the angle Q.

The general transformation formula (the case of three dimensions and more) is deduced from the "envelope theorem" described in particular by Régis VAILLANT in:

"USING OCCLUDING CONTOURS FOR 3-D OBJECT MODELLING" first European Conf. on Computer Vision, Antibes, April 1990, Springer Verlag;

"DIFFERENTIAL GEOMETRY AND VISION BY COMPUTER: DETECTION AND RECONSTRUCTION OF OCCULTING CONTOURS OF THE SURFACE OF A NONPOLYHEDRAL OBJECT", Chapter 5 of the Doctoral Thesis in Science, presented at the University of Paris-Sud, Centre d'Orsay, on the 19th Dec. 1990, in particular the formulae 5.21, page 65.

An example of a local transformation formula, in the case of an acquisition system of the type of that of FIG. 2 is illustrated in FIG. 16. The transformation formula is $$X = -\sin(Q).f(Q) - \cos(Q).df(Q)//dQ$$

$$Y = +\cos(Q).f(Q) - \sin(Q).df(Q)/dQ$$

where x and y are the coordinates of the point R reconstructed in the sectional plane, where the function f() defines a critical line F in the image of projections, with Q being the scanning angle and U=f(Q) the position of the sensor along the straight line in rotation. In other words, (U,Q) are the coordinates of point P in the image of projections and f() is the equation of the critical line F.

Moreover, Q gives the direction of the tangent to the characteristic surface S at R. This gives the transformation formula which makes it possible to pass from P(f(Q),Q,df(Q)/dQ) to R(x,y,Q). The accuracy of the reconstruction depends on the accuracy with which one succeeds in determining f(Q) and hence on the accuracy of the contour tracking of the preceding step (c) but also on the accuracy of the determination of the slope of the function f at point Q (an improved accuracy in accordance with the invention).

The transformation by retroprojection remains to be considered. This technique starts from a sampling of the critical shape obtained by the detection and tracking of the contours in the image of projections.

The retroprojection method (FIG. 17) lies first of all in defining (170) a discretisation table or grid T(x,y) in real space, initialized, for example, at 0.

For each sampled point P of the critical shape in the space of projections (steps 172 and 177), the corresponding acquisition line is determined (174). For each field of the grid T(x,y) traversed by this line, T(x,y) is incremented (176) by a value associated with the point of the critical shape and termed "confidence coefficient" (assumed to be 1 in the drawing for the sake of simplification).

This confidence coefficient reflects the confidence accorded to the fact that this point of the critical shape duly belongs to a critical contour. For example, the confidence coefficient may be derived from the value of the modulus of the gradient of the image of projections at the point in question.

Thus to the discretisation grid there corresponds a two-dimensional image when one is concerned with a section of the examined body (or a three-dimensional image in the general case), in respect of which the value contained in each field will be the greater, the greater the chances that it is located on a characteristic surface of the examined body.

Contour tracking (178) is thus again applied, this time in real space so as to find the line (or surface) of real space corresponding to a characteristic surface of the body (179).

We will now pass to the description of reciprocal geometrical tomography. As indicated by its name, it operates in reverse and by successive approximations.

Its point of departure is an initial approximation (or estimation) SO in real space of a characteristic surface S of the examined body.

This initial approximation will be developed by passing through a series of intermediate versions Sj to a definitive reconstructed version Sp, representing the characteristic surface S in the best way. This is similar to the technique generally termed "use of deformable models for contour tracking". Examples of this are described in:

the article of KASS, WITKIN and TERZOPOULOS already referred to;

and above all, the INRIA publication of COHEN and COHEN already referred to.

Reciprocal geometrical tomography is distinguished from the conventional method by the fact that it uses the image of projections for computing the updating of the (estimated) characteristic surface in real space.

This reciprocal geometrical tomography is used for the improvement of the accuracy concerning the position of characteristic surfaces of the body, because this method makes it possible to avoid the loss of information (tangent, curvature) encountered in the computed tomography of conventional scanners.

Another use of reciprocal geometrical tomography is for the tracking of deformations and movements of characteristic surfaces of the body with respect to time, also termed "dynamic contour monitoring or tracking".

For dynamic contour tracking, one uses the critical shapes obtained during a scan at a given instant t, (and converted into characteristic surfaces in real space) as the basis for computing the characteristic surfaces at the following instant t+dt. It is recalled that to a characteristic surface in real space, there always corresponds a shape in the space of projections, designated "dual associated shape". This dual shape may be aligned in the case of a two-dimensional image of projections or a surface in the general case.

The computation of the dual shape is direct for all the points of the shape in real space in respect of which one can compute the direction of the tangent if one is concerned with a line, or in respect of which one can compute the tangential plane if one is concerned with a surface.

Figure 18:
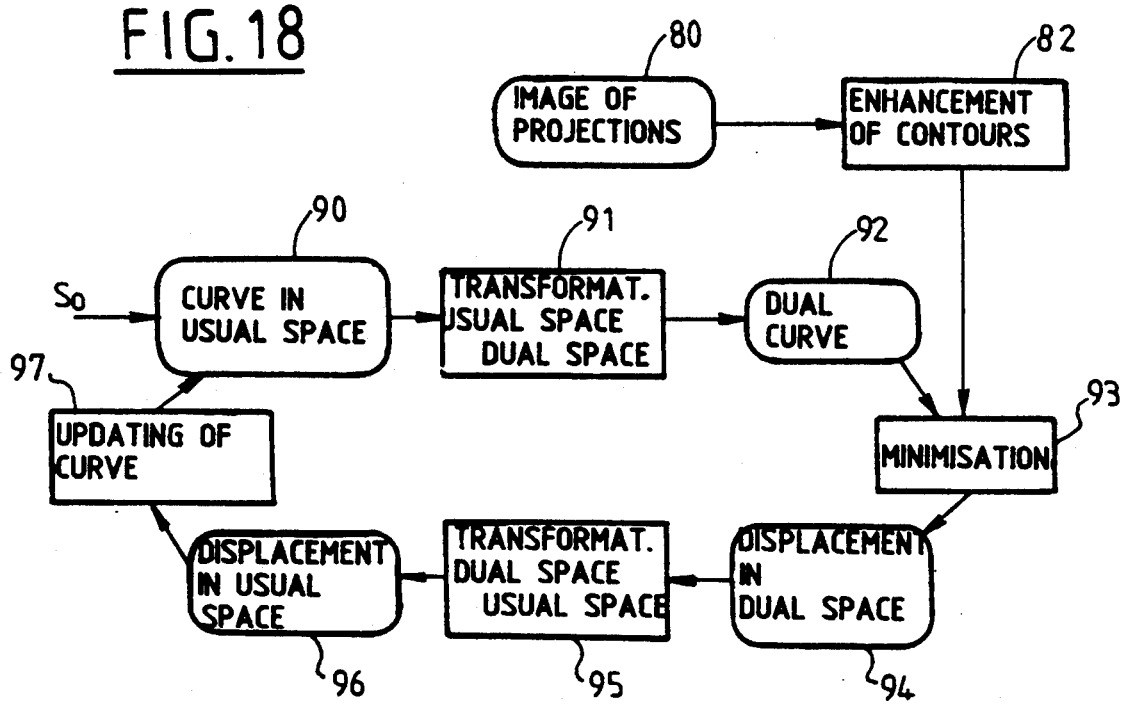
FIG. 18 is a flow chart of the reciprocal geometrical tomography method according to the invention.

An example of the implementation of the reciprocal geometrical tomography is described in the operational flow chart of FIG. 18.

At the start, an image of projections is prepared (80), its contours are then enhanced (82). The following successive approximation steps are:

preparing (90) an initial approximative version SO in real space of the characteristic surface which one wishes to recognize. By way of example, this approximate shape may be given manually by the user of the method or come from the application of the direct geometrical tomography method, or yet again be the result of conventional contour tracking in an image obtained by computed tomography.

transforming (91) its shape SO into its dual shape FO belonging to the space of projections stored at (92).

computing (93) for each point of the dual shape FO, a displacement in the space of projections which comes close to this dual shape FO of the critical shape which is closest in the image of projections. This is a minimisation of the difference between the FO and the said closest critical contour. After the minimisation, there will nevertheless subsist a difference between FO and the shape FO with the "miniraised" differences.

determining (94) the displacements which must be applied to the shape FO to obtain the new shape F'O in the space of projections closest to the exact critical contour F.

A "residual error" is also deduced therefrom which represents as it were the residual distance existing between the estimated shape F'O and the exact shape F.

Subsequently, a new shape S'O is computed in real space on the basis of F'O, its differential characteristics, and of a local geometrical transformation formula.

A variant in obtaining S'O lies not in an global transformation of F'O into S'O, but:
- in considering each displacement which allows a point of FO to be brought into a point F'O in the space of projections, and
- in transforming it into a displacement in real space which brings a point of SO to a point S'O.

In other words, this amounts to applying a local geometrical transformation formula which operates on the displacement instead of operating on the positions.

FIG. 18 has been drawn up for the case of displacements. Therefore:
- the displacements of the space of projections are transformed (95) into displacements in the real space stored at (96).

In accordance with the preceding discussion, the shape F'O would become a version S'O in real space.

In practice, the conversion operation is accompanied by a smoothing filtering operation so as to reduce the irregularities which have appeared during the transformation of FO into F'O. This smoothing operation may be effected by conventional signal processing techniques.

The version SI thus obtained is then stored (97) in real space.

A variant lies in effecting the smoothing on F'O in the space of projections before the transformation into S'O.

Another variant lies in imposing rigidity criteria to the used shapes Fi or Si by trying for example, to minimise the curvature of these shapes.

If the number of effected iterations exceeds a fixed number p of iterations or if the residual area falls below a fixed threshold, the shape Sp obtained is considered as being a sufficient approximation of S and becomes the result of the process. Otherwise one is returned to step (90) where So is replaced by the new shape S1 which has been obtained.

Figure 19:
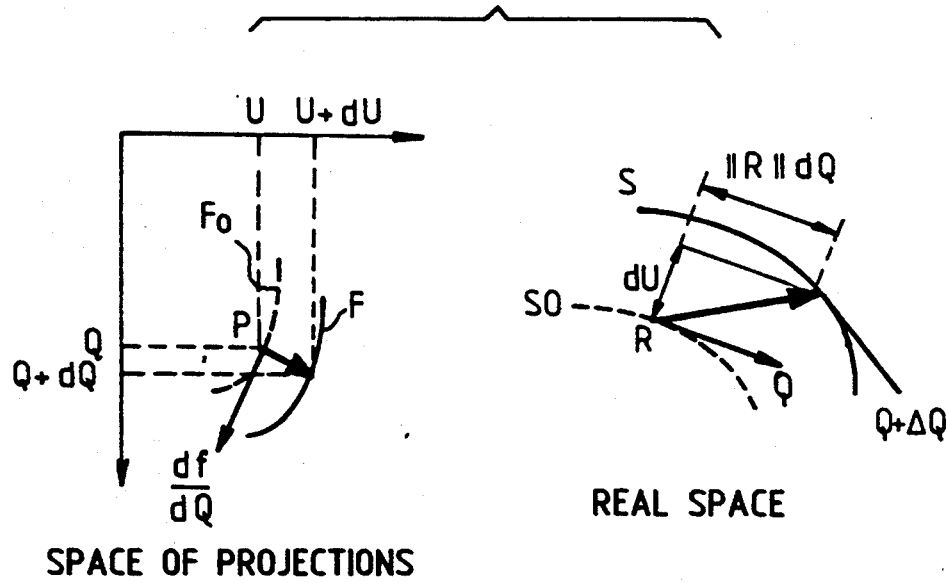
FIG. 19 is a geometrical diagram illustrating the improvement of the position by a local transformation operating on the displacements.

A more accurate example of this procedure in the case of a scanning device of the type described in FIG. 2 and generating an image of the projections "U,Q" is illustrated in FIG. 19.

It lies in seeking displacements for FO in the space of projections along lines perpendicular to the curve FO. If FO is defined by a function $U=f(Q)$, for a point P of coordinates $(U=f(Q),Q)$, one searches for the critical contour closest to P in the image of projections, along a direction perpendicular to the curve F at Q.

One thus calculates a small displacement (dU, dQ) in the space of projections which is translated into real space by a displacement of the point RO of SO into a point R'O of S'O.

It is assumed that the curve SO is represented by a chained list of points, each point being defined by a triplet (x,y,Q) where (x,y) are coordinates of the point in real space and Q the angle indicating the direction of the tangent (and therefore of the normal to SO at this point.

SO is transformed into a chained list of points FO of the space of projections; that is to say, one transforms each point (x,y,Q) of SO into a point (U,Q,df(Q)/d(Q)) of FO.

One subsequently computes a chained list of points representing F'O by transforming
(U,Q, df(Q)/d(Q)) into (U+dU, Q+dQ, df(Q)/d(Q)).

Finally, SO is transformed into a chained list of points of real space S'O by transforming each point (x,y,Q) of SO into a point (x', y', Q') of S'O, with $$x'=x-\sin(Q).dU-y.dQ,$$

$$y'=y+\cos(Q).dU+x.dQ,$$

$$Q'=Q+dQ$$

The expert will understand that this concerns a "local transformation" formula but which is applied to displacements.

In polar coordinates plotted on the normal at SO at the point R, the displacements are:
dU, and dQ times the modulus of the vector OR, where the modulus of OR is $(x^2+y^2)^{\frac{1}{2}}$.

S1 is obtained from S'O, by effecting a smoothing of the values (x', y', Q') of the curve S'O, taking into account a continuity criterion concerning the position of the points and the direction of the tangents.

The reciprocal geometrical tomography method thus makes it possible to improve the placing of the estimated surfaces relative to the real characteristic surfaces of the examined body and to track the displacement and the deformations of these surfaces in the course of time.

The case of dynamic tracking is particularly well suited because the processing operating on the gross signals to update the shapes corresponding to the characteristic surfaces is very localised.

By way of example, there will be considered the case of an acquisition system according to FIG. 1 for which the scanning angle varies linearly with time with a rotation period T.

It will be assumed that the apparatus affords n different scanning angles, the time separating each scan being $dt=T/n$.

The time taken is an instant t (the time indications are placed below in square brackets when they are associated with other symbols; in the drawings they are given as subscripts).

Figure 20:
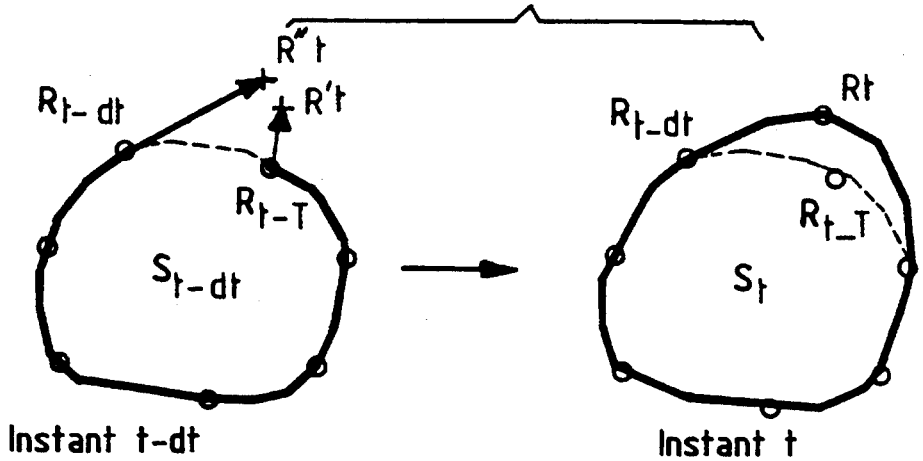
FIG. 20 is a geometrical diagram illustrating the dynamic updating of the curve by the use of local data.

It is assumed that one has already determined for a complete revolution between $t-T$ and $t-dt$, hence starting from n different views, the position of a shape $F[t-dt]$, corresponding to a characteristic surface $S[t-dt]$ of the observed body (FIG. 20).

It is moreover assumed that $F[t-dt]$, the dual shape associated with $S[t-dt]$ is defined by a function $U=f[t-dt](Q)$.

A new shape S[t] is then determined which has all the points of $S[t-dt]$ except $R[t-T]$, which is replaced by a new point R[t]. The R[t] of S[t] will be associated with a point P[t] of F[t] corresponding to the angle Q[t] (a function of time Q(t)). During the preceding rotation and for the same angle $Q[t]=Q[t-T]$, one had a point $R[t-T]$ of the version $S[t-T]$ of the characteristic surface S.

The function defining $F[t-T]$ which the dual shape associated with $S[t-T]$ is:

$$U=f[t-T](Q)$$

One also defines:

$$U[t-T]=f[t-T](Q[t])$$

The point R[t] will be deduced:
- on the one hand from an extrapolation of the version S[tdt],
- on the other hand, from the measurement of the gross signals obtained for the sensors situated in the vicinity of the position $U[t-T]$ on the line of sensors and for angles situated round Q[t], in other words from a group of gross signals (U[t−T]±dU, Q[t]±dQ).

In the case where one has an image of projections, this amounts to exploring a small window in this image round the point (U[t−T], Q[t]. The computation is effected by searching along the perpendicular to the dual shape F[t−T] at the point (U[t−T], Q[t]), the nearest critical contour point which provides the displacement (Du,Dq). One deduces therefrom a displacement Dx, Dy with:

$$Dx = -\sin(q).Du - y.Dq$$

$$Dy = \cos(q).Du + x.Dq$$

which brings the point P[t−T] into a position P'[t].

The expert will understand that this concerns a "local transformation" formula, but applied to the displacements.

The final position P[t] is a compromise between the position of a point P''[t] extrapolated from the shape S[t−dt], and the position of the point P'[t] obtained by searching for the closest critical contour in the space of projections. The weighting between the positions P''[t] and P'[t] is adjusted to regulate the degree of smoothing of the curves S[t] as desired.

The reciprocal geometrical tomography method thus makes it possible to determine for each time interval dt a new curve S[t] representing a characteristic surface of the examined body. It also permits the tracking of the displacements and deformations of this surface in real time.

By way of example, if the period of rotation of the scanning device is 10 seconds, and if the number of scanning angles is 256, the method permits the position of the curve to be updated over 1/256th of its length in 1/25th of a second.

Moreover, the method merely requires the measurement of only a few sensors round the position obtained during the preceding rotation, which makes it possible for example, to reduce the zone swept by the auscultation beams and for the same reason the quantity of waves received by the examined body.

Another object of this invention concerns an apparatus permitting the tracking in real time of the movements or deformations of characteristic surfaces of the examined body evolving in the course of time. The invention allows the position of characteristic surfaces to be very rapidly updated between one scan and the following one.

The apparatus is constituted by a scanning device and a computer. The scanning device is similar to one of those described above, and the computer executes a program corresponding to the reciprocal geometrical tomography method.

Another object of this invention is to create an apparatus and a method for intervention making it possible to act inside a body by means of one or several wave beams, termed "active wave beams", each active beam being focused along a precise direction, that can be likened to a straight line and termed "line of action". These active beams are disposed so as to pass through a precise point of the body, termed the "target point". The invention is characterized in that it uses in order to plan the guidance of the active beams, critical lines or surfaces defined in the space of projections and corresponding to the critical contours associated with the characteristic surface of the examined body. The object of the invention is to prevent the active beams from penetrating into delimited zones inside the body and termed "protected zones".

Figure 21:
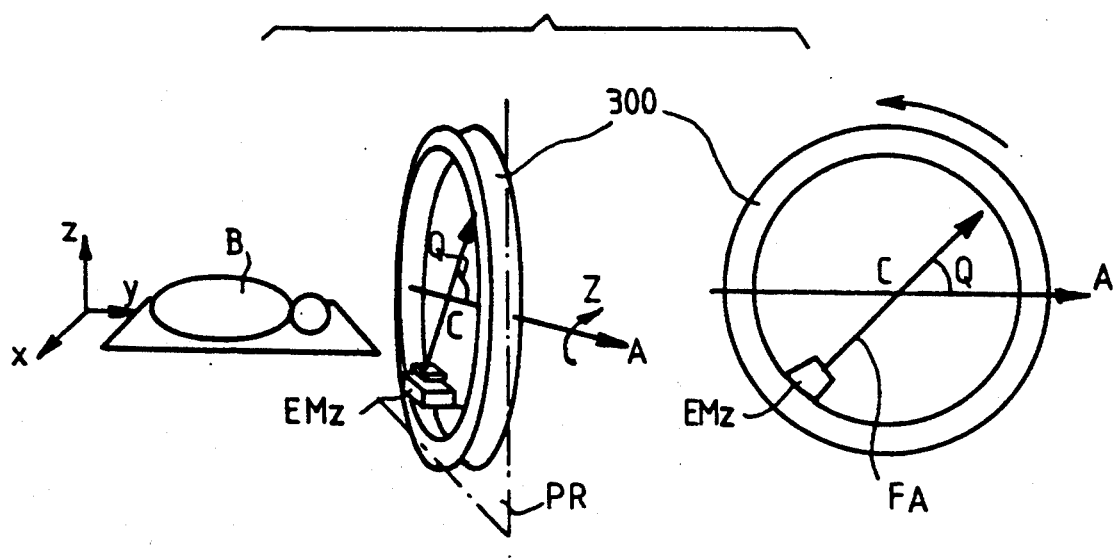
FIG. 21 shows the diagram of a variant concerning an apparatus for intervention with an active wave beam.

An embodiment of the apparatus for intervention in accordance with the invention consists of:

(a) a circular movable support 300 (FIG. 21) whereon there are located one or more generators of active beams;

(b) a computer unit and a memory.

The movable support is capable of effecting rotational displacements round its centre C in a plane termed "plane of rotation". A device also allows the direction of the plane of rotation to be varied in the course of time by causing the plane of rotation to turn round an axis A contained in the horizontal plane passing through the centre of rotation C.

The rapid start-up of the movement of the movable support allows the quantity of waves received in the peripheral zones of the body to be reduced and to concentrate it at the level of the centre of rotation C.

As a first approximation and for a uniform speed of rotation, the quantity of waves received per unit time is inversely proportional to the distance from the centre of rotation C in the plane of rotation.

The fact that it is possible to change the plane of rotation allows the quantity of waves received by the peripheral zone in the course of time to be reduced still further.

Each line of action is set by means of two angles (Q, Z). Z indicates the angle between the plane of rotation PR and the horizontal plane. Q indicates the angle between the line of action in the plane of rotation and the axis A. The control formula Q(t) may be a rotation at constant speed w.t, a pendular movement, or any movement whatever.

A device permits moreover the relative displacement of the treated body relative to the centre of rotation C, either by displacement of the body B, or by displacement of the apparatus. The control parameters for the intervention device thus are the speed of rotation w, the angle of the plane of rotation Z (optionally another angle), and the three relative positions (x,y,z) of the body relative to the centre of rotation, plus possibly three coordinates for the direction of the body.

Certain treatment apparatuses effect the positioning by a stereotactic device which makes it possible to determine the relative position of the target point in relation to the treated body, and thus to bring the target point to the centre of rotation of the apparatus by acting on the controls (x, y, z) and possibly the angle controls. The memory of the apparatus contains the description of the characteristic surfaces of the treated body, obtained, for example, by the geometrical tomography method. The memory of the apparatus also contains the data of the surfaces defining the zones of the body to be protected.

Such a stereotactic device is described in the publication: "RADIO-SURGERY AT THE TENON HOSPITAL (1986-1989)—METHODOLOGICAL DEVELOPMENT TOWARDS 3-D DOSIMETRY WITH A VIEW TO OPTIMIZING INTERCRANIAL IRRADIATIONS UNDER STEREOTACTIC CONDITIONS", Dimitri LEFKOPOULOS, Paris, Assistance Publique, June, 1989.

The space of projections will be constituted by three dimensions "U, Q, Z" whereof each point corresponds to a straight line of real space. The angular dimensions "Q, Z" correspond to the angles Q and Z already referred to.

The additional dimension U (FIG. 22) makes it possible to represent orientated straight lines passing through two points P1 and P2 of the circular support, but not necessarily passing through the centre of rotation C as follows: the angle Q represents the direction (P1, C). The point P'2 is the point of the circular support that is symmetrical with P1 in relation to C. The distance U is the curvilinear abscissa (along the circular support) of P2, counted from the point P'2. The pair (U, Q) thus defines uniquely an orientated straight line intersecting the circular support at two points.

The computer unit is programmed so as to transform the surfaces of real space into surfaces of the space of projections (U,Q,Z). A volume in real space is transformed into a volume in the space of projections. The intersection of a volume in the space of projections with the plane U=O allows zones of the plane (Q,Z) corresponding to these volumes to be computed.

In particular, the protected zones appear in the plane (Q, Z) as surface elements. A line of action of an active beam corresponds to a point belonging to the plane (Q,Z) termed dual point associated with the active beam, whose position evolves in the course of time according to the control formula.

The computer unit makes it possible to establish a control formula (Z=g(t), Q=f(t)) for each active beam so as to avoid as far as possible passing over the surface elements corresponding to the protected zones.

In the case where the generated control formula cannot prevent the passing over protected zones, for example, in the case of a control formula fixed once and for all, the computer unit allows the instants to be established when each active beam must be activated or deactivated, simply by checking whether the dual point associated with the active beam is inside a protected zone or not.

One way of effecting this test is to compute once and for all a digital image corresponding to the rectangle of the plane (Q,Z) limited to the values comprised between 0 and 2P.

Figure 23:
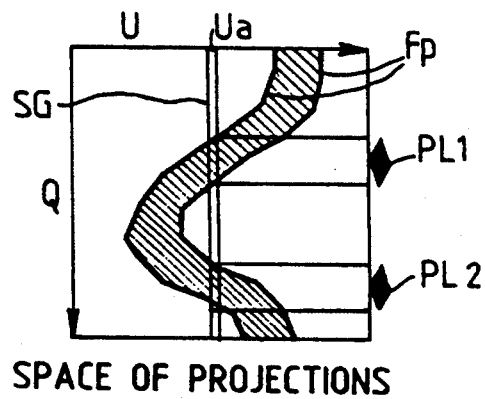
FIG. 23 is a geometrical diagram illustrating the generation of commands for the activation of the active wave beam on the basis of critical contours in the space of projections.

FIG. 23 concerns the simplified case where the angle Z is not caused to vary. The image of projections is left with only two dimensions U and Q. The two contours Fp delimit in the space of projections the zone or object to be protected in the body B.

If Ua designates the value of the parameter U associated with the active beam, the vicinity of U=Ua in FIG. 23 designates the activity zone of the beam in the space of projections. This vicinity SG is delimited by two parallel verticals.

The zone delimited by the two critical contours Fp (associated with the characteristic surfaces of the treated body) intersects the said vicinity SG in two areas PL1, PL2 which determine the instants when the active wave beam must be deactivated so as not to penetrate into the protected zones of the body.

The method of intervention which also forms part of this invention thus lies in determining the trajectory of an active beam so as to prevent this beam from penetrating inside prohibited zones of the space. This method is characterized in that it uses a representation of the treated body and of the protected zones in a space termed "space of projections" where each point represents a straight line of real space and wherein the set of the lines of action which the active beam can cover can be represented.

An example of the implementation of this method lies in determining for each characteristic surface of the body of real space, a critical line or surface in the space of projections formed by the locus of the straight lines tangential to the critical surface.

In the case of closed characteristic surfaces enveloping a volume, the associated critical surface is orientated so as to define an interior and an exterior. To one line of action, there corresponds a point of the space of projections termed dual point associated with the active beam.

The method of the invention lies in determining paths in the space of projections for which the dual point associated with the active beam is always situated outside all the critical surfaces defining the protected zones.

In the case where the control formula is such that it is not possible to avoid a protected zone, the intervention method establishes the instant when the active beam must be deactivated and reactivated.

In the case where the beam cannot be likened to a straight line but to a beam of straight lines with a known divergence, the beam is represented in the form of a disc in the space of projections termed "dual spot associated with the active beam" if the latter is two-dimensional. The trajectory of the dual space defines a band in the space of projections corresponding to a vertical band when the target point is situated at the centre of rotation of the apparatus (FIG. 23). The dual spot may be approximately represented by a "hyper-sphere" in the general case.

One way of obtaining this intervention method lies in computing a digital image termed "synthetic of projections" having the same dimensions as the space of projections and where each field contains data relating to the set of points of the body intersected by the straight line corresponding to the point in question of the space of projections.

An example lies in creating a digital image where each field indicates by a binary value whether the straight line of the corresponding real space intersects a protected zone or not.

Another example lies in associating a value with each field of this synthetic image of projections, which value is, if it is strictly positive, decremented each time the dual spot passes through this field and which, if it is negative or zero, indicates that the active beam must be deactivated. This value represents as it were a "radiation credit" which decreases each time the active beam takes a direction very close to the direction corresponding to this field of the synthetic image of projections.

Another way of implementing the intervention method concerns a different way of obtaining the critical contours in the space of projections "E1" relating to the intervention apparatus.

It is distinguished from the preceding implementation in that one does not start from the reconstructed surfaces corresponding to the body in real space, but directly from the image of projections "I2" obtained by a conventional acquisition device and which is thus situated in a space of projections "E2"

Since it is possible that the examined body may have been displaced between the instant when the data have been acquired and the instant when the intervention is effected, or as, moreover, the characteristics of the acquisition device and of the intervention apparatus may vary to a considerable extent, there is no reason why the two space of projections E1 and E2 should be similar. (The method set out above was not affected by this problem because one proceeded by way of the real space).

If, on the other hand, it is desired to create directly an image of projections "I1" in the space of projections E1 from the image I2, it is for this purpose necessary to effect a resampling of the image I2 of the space E2 in the space E1. The resampling techniques are known image processing techniques which are used from the moment when for each point of the arrival space E1, the corresponding departure space E2 is known.

As each point of space E1 corresponds to a straight line of real space, it suffices to look to which point of space E2 this straight line corresponds. This method for the direct transformation of the image I2 is therefore applicable to all the points of E1 for which the corresponding straight line is represented in the space E2. For example, in the case of an intervention apparatus solely movable in rotation in a given sectional plane, this method is applicable on the basis of the gross data acquired from an acquisition device of the type described in FIGS. (1) or (2). The steps of this method then are:

(a) resampling of the image of projections I2 of the space of projections E2 associated with the scanning device in an image of projections I1 of the space of projections E1 associated with the intervention apparatus;

(b) detecting and tracking of the critical contours in the space of projections I1;

(c) an automatic selection, or selection by the user, of the protected zones of the body. For example, the critical contours are transformed into characteristic surfaces in the usual space by the geometrical tomography method and the reconstructed surfaces are presented to the user who designates them;

(d) determining during the pretreatment or in the course of the intervention, the intersections of the critical contours and the dual spot associated with the active wave beam.

Another object of this invention is the definition of an intervention apparatus and method, making it possible at the same time to follow the displacements of the critical surfaces and to act at a precise point, termed "target point" of the treated body by means of active wave beams all passing through this target point.

The apparatus comprises the same characteristics as the intervention apparatus described above.

It is distinguished therefrom (FIG. 24) in that the rotating support round the body includes on either side of the examined body:

a source EMa of auscultation wave beams and a series of sensors Ci (angles Qi), placed along the circular support on the opposite side to EMa;

one (or more) generator(s) EMZ of the active beam(s) placed on the support so as to reach neither the sensors nor another beam generator. A line of action of direction Qj is associated with each generator.

The centre O is the target point of the body B.

Figure 24:
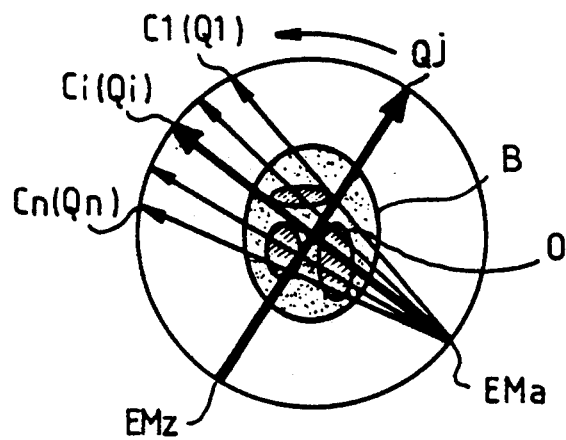
FIG. 24 is a schematic diagram of an apparatus for intervention having both a source of auscultation waves and an active wave beam.

The apparatus also includes a computer unit and a memory (not represented in FIG. 24).

In this case, there is agreement between the space of projections E1 associated with the intervention apparatus and the space of projections E2 associated with the auscultation device. There is therefore only a single space of projections; "E" and a single image of projections "I" which is acquired by the auscultation device of the intervention apparatus.

Figure 25:
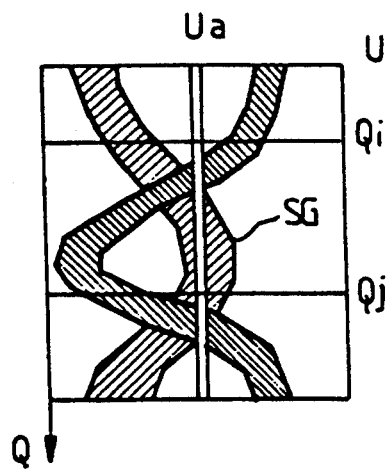
FIG. 25 is a geometrical diagram illustrating the intervention method used for generating the activation commands, in conjunction with dynamic tracking of the critical contour lines.

FIG. 25 illustrates what happens in the space of projections. It is assumed that there are two zones shaded differently to be considered. At the angle Qi, the acquisition apparatus updates the definition of these zones.

For its part, the intervention apparatus is associated with a parameter Ua round which a vicinity SG (a dual spot associated with the active beam) is defined as before. At the time in question, it is located at the angle Qj. If the densely shaded zone is to be treated, the intervention beam is only activated when the vicinity of the point Ua, Qi is situated in this zone.

The determination of the critical contours is thus effected in real time in the image of projections I and each point of the critical contour is reupdated during each rotation of the acquisition device, which allows the movements of the body to be tracked in the course of the intervention.

The relative position of the dual spot or spots associated with the active beams in relation to the critical contours tracked in the image of projections also makes it possible to determine in real time, activation or deactivation commands, commands for the control of the active beams or yet again commands for the recentring of the treated body so as to maintain the target point always at the focussing centre of the active beams.

This apparatus and this method thus make it possible to intervene at a point of a movable body in the course of time.

Figure 26:
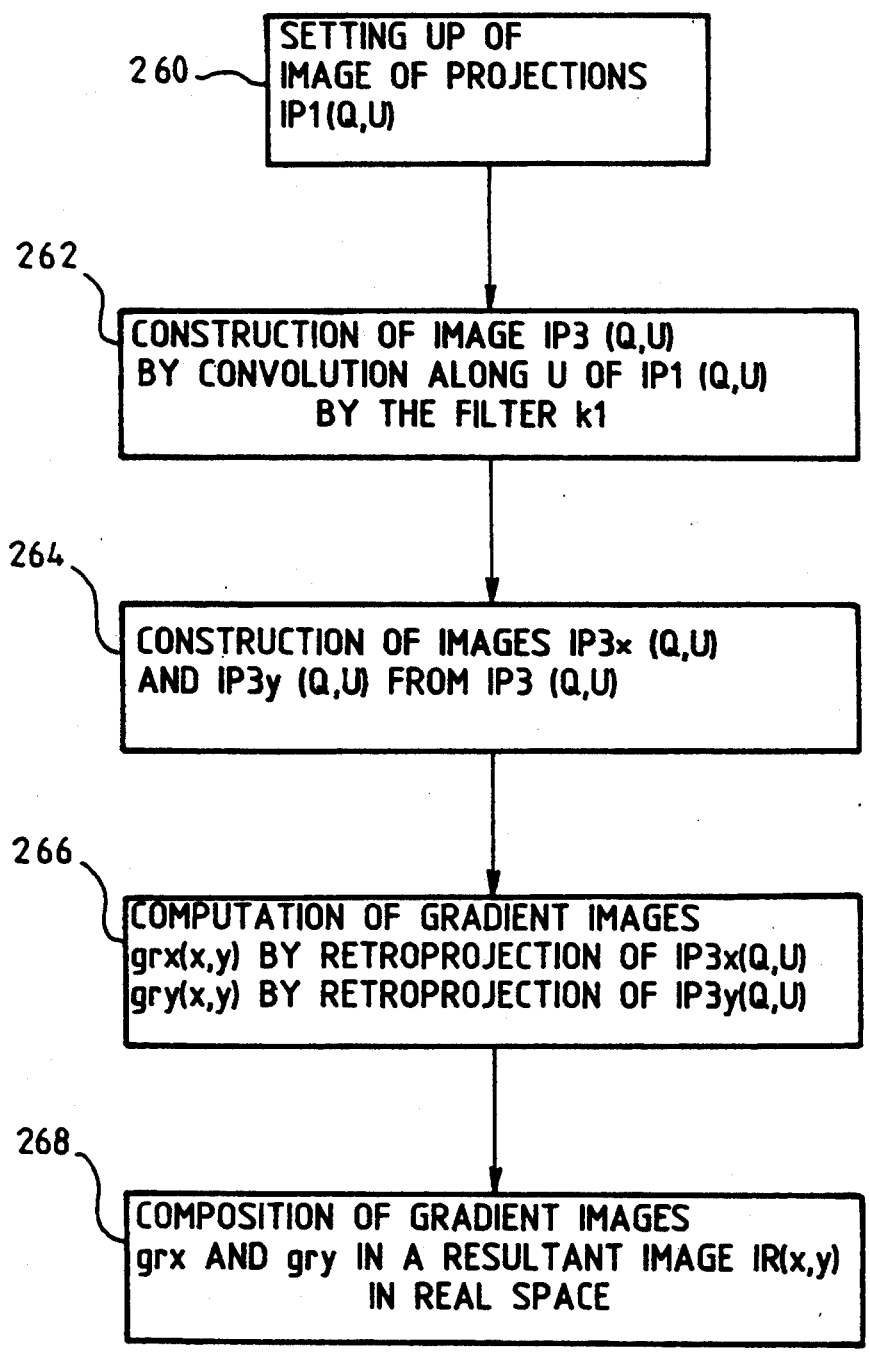
FIG. 26 is a flow chart of another advantageous variant of the embodiment.

Another major variant of the invention will now be described with reference to FIG. 26 and to the annex of formulae added at the end of the description.

This variant generates directly in real space an "image of gradients" of a section of the body in question. It is characterized in that the contours are enhanced in the image of projections as before, while a retroprojection is effected subsequently for passing into real space where it is possible to effect the contour tracking.

Reference is made to EKSTROM's work already referred to, Chapter 4, "IMAGE RECONSTRUCTION FROM PROJECTIONS", contribution of A. C. KAK.

By way of example, the formulae given correspond to the case of a third generation scanner with a parallel beam (FIG. 2).

The starting point (step 260, FIG. 26) is the setting up of the image of projections now designated IP1[Q,U]. (To relieve the notations, square brackets are used for the variables on which there depends a function).

The absorption coefficient of the auscultation waves at a point $(x,y)$ of real space, designated $ABS(x,y)$ is given by formula (I) where:

IP2 [Q,U] given by formula (II) is another image in the space of projections obtained by convolution of IP1, by a filtering function $h1[b]$, b corresponding to the "line" parameter U, that is to say, the convolution is effected for all the lines (all the Us) of IP1 with Q being constant; and $h1[b]$ may be given for example, by the formula (III) where the integration limits $+/-W$ (capital letter) amount to $\frac{1}{2}.u$, while u is the interspacing between two neighbouring sensors on the line U.

Except for the notations, these three formulae are similar to the formulae (6), (7) and (8) given on page 120 of the above mentioned contribution of KAK.

The invention uses the component along the coordinate U of the gradient of the image IP2 designated IP3 and defined by the formula (IV).

On the basis of these products of IP3 times cos Q and sin Q, designated IP3x and IP3y respectively, as shown by the formulae (V) and (VI), the Applicant has observed that it is possible to determine the x and y components of the gradient of the image in real space. These components designated Grx and Gry are obtained by the formulae (VII) and (VIII) which represent a retroprojection of the images IP3x and IP3y.

The Applicant has, moreover, observed that it is possible to compute the image IP3 directly from the image IP1. For this purpose:

the filtering function k1[b] is defined which is the derivative of h1[b] in relation to its single variable designated b, as stated by formula (IX);

the image IP3[q,u] is then calculated on the basis of formula (X), which represents the convolution of IP1 by this filtering function k1[b], b corresponding to the "line" parameter U;

but by noting b=n.u where n is a relative integer comprised between $-N/2$ and $+N/2$, N being the number of sensors, the Applicant has observed that it is possible to express k1[n.u] in a discrete form in accordance with formula (XI).

This "discrete" formula of k1 may, according to the equations (XII), also be written remarkably simply and be capable of being computed in advance and hence tabulated in the memory for example.

It is thus possible to compute very simply and quickly and, moreover, by processing only one line at a time of IP1, with Q being constant, as it arrives from the acquisition device.

Two observations should be made:

this technique is an enhancement of the contours of the image IP1 in the image IP3 (in the case in point, the one to which reference has been made above);

since k1 is a derivative, this contour enhancement is based on a "differential" processing of the measurements. As has also been described above, this processing could be effected at the level of the sensors.

After the step 260 already referred to, one will therefore:

compute the image of projections with enhanced contours IP3 in step 262 as stated above, deduce therefrom in step 264 the auxiliary images IP3x and IP3y, which may also be effected as the lines arrive, compute in step 266 the images of the gradient components x and y in real space according to formulae (VII) and VIII), this being a global processing in Q which varies from 0 to pi for all the lines, and deduce therefrom an image of the gradient vector modules in real space, IR[x,y], being defined conventionally by the formula (XIII).

In other words, this filtered retroprojection method makes it possible to pass from the image of projections where Q is the angle of incidence of the rays and U the coordinate of the detector along the detector line, to a digital image of the gradients in real space. IR[x,y] is a contour image which may be used to give a first approximation for the reciprocal geometrical tomography.

The contour tracking may also be effected directly on this image IR[x,y], by possibly having recourse to the components of the gradient Grx and Gry previously obtained, so as to obtain the characteristic surfaces or "boundaries" of the examined body.

Besides, it is only the operation 266 that requires a large computing input. In all the applications such as the control of the intervention apparatuses where one is only concerned with certain precise points of real space, it suffices to limit the computing (the retroprojection) according to the formulae (VII) and (VIII) only to these points.

Of course, the present invention is not restricted to the modes of embodiment described. In particular, it will be possible to use for each embodiment means having the same function described with reference to another embodiment or other equivalent means. One may also eliminate certain functions where they are not necessary or desired.

What is claimed is:

1. An apparatus for assisting with examining a body emitting wave beams, comprising:

means for receiving said body to examine;

sensor means for collecting said wave beams along a plurality of respective axes termed "acquisition lines," each of said axes being designated by at least two axis parameters, and for transforming said collected wave beams into signals defining an image of projections of part of said body, each of said signals representing intensity of one of said wave beams;

means for determining differences between selected ones of said signals relative to said axis parameters;

means responsive to said differences for detecting jumps in intensity of said signals, each jump being a critical point corresponding to an acquisition line tangential to a boundary of said body and wherein said axis parameters of said critical points identify a position of at least one portion of said boundary.

2. An apparatus as recited in claim 1, wherein said sensor means are disposed in a one-dimensional arrangement, and said axis parameters include a position coordinate and at least one direction coordinate.

3. An apparatus as recited in claim 2, wherein said sensor means are movable relative to said body received in said receiving means, to thereby vary with respect to time at least one of said axis parameters.

4. An apparatus as recited in claim 1, wherein said sensor means are disposed in a two-dimensional arrangement, and said axis parameters include at least two position coordinates and at least one direction coordinate.

5. An apparatus as recited in claim 1, wherein said means for determining differences include:

scanning means for determining a set of critical points of said image of projections where jumps in intensity of said signals occur, and image processing means for subsequently determining critical contours, each of said critical contours being formed by a continuous succession of said critical points.

6. An apparatus as recited in claim 1, wherein said sensor means comprise means for acquiring said signals representing intensity of wave beams as an ordered set of gross data signals expressed in a differential form, said gross data signals defining as a function of said axis parameters an "image of points of projections" in a projection space, which is a multidimensional space dual of real space, each point in said multidimensional space representing a straight line in said real space.

7. An apparatus as recited in claim 1, further comprising means for emitting said wave beams in relative displacement to said body on the basis of said axis parameters of said critical points.

8. An apparatus as recited in claim 1, comprising a conversion processing means for operating reconstructed signals which represent in real space the position of at least one portion of said boundary.

9. A method for assisting with examining a body from which wave beams emerge, comprising the steps of:
　placing said body in an examination;
　collecting with sensors said wave beams emerging from said body along a plurality of axes termed "acquisition lines" each of said axes being designated by at least two axis parameters, and transforming said collected wave beams into signals defining an image of projections of part of said body, each of said signals representing intensity of one of said wave beams;
　determining differences between selected ones of said signals relative to said axis parameters;
　detecting jumps in intensity of said signals, each jump being a critical point corresponding to an acquisition line tangential to a boundary of said body and wherein said axis parameters of said critical points identify a position of at least one portion of said boundary.

10. A method as recited in claim 9, further comprising the steps of:
　scanning said critical points of said image of projections where jumps in intensity of said signals occur, and
　subsequent image processing for determining critical contours, each of said critical contours being formed by a continuous succession of said critical points.

11. A method as recited in claim 10, wherein said scanning includes computation of an image of projections with enhanced contours, and said image processing includes retroprojection of components of said image into images of gradient components in real space, to synthesize a gradient image in real space.

12. A method as recited in claim 9, further comprising a step of acquiring said signals representing intensity of wave beams as an ordered set of gross data signals defining as a function of said axis parameters an "image of points of projections" in a projection space, which is a multidimensional space dual of real space, each point in said multidimensional space representing a straight line in said real space.

13. A method as recited in claim 9, further comprising emitting said wave beams in relative displacement to said body based on the axis parameters of said critical points.

14. A method as recited in claim 9, further comprising converting said axis parameters of said critical points into reconstructed signals representing in real space a position of at least one portion of said boundary.

15. A method as recited in claim 14, wherein said converting includes a weighted retroprojection of said critical points into said real space and contour tracking in said real space, which supplies said boundary.

16. A method as recited in claim 14, wherein said converting includes a local geometrical transformation.

17. A method as recited in claim 14, wherein said converting includes a global geometrical transformation.

18. A method as recited in claim 14, further comprising a step of estimating internal and external boundaries of said body in real space and, said converting includes:
　i) conversion of said estimated boundaries of real space into estimated critical contours in a dual space,
　ii) comparison of said estimated critical contours with observed critical contours, which provides rectification data,
　iii) conversion of said rectification data from said dual space into real space, and
　iv) updating of the said estimation of said boundaries, steps (i) through (iv) being repeated until a chosen degree of agreement is obtained between said estimated critical contours and said observed critical contours, which provides reconstructed boundaries.

19. A method as recited in claim 18, wherein said rectification data are corrections of said estimated critical contours which are converted from said dual space into said real space, and on the basis of which said estimation of said boundaries is updated.

20. A method as recited in claim 18, wherein said rectification data are corrected estimated critical contours which are converted from said dual space into real space, and on the basis of which said estimation of said boundaries is updated.

21. A method as recited in claim 18, comprising dynamic tracking of said body, wherein an initial estimation of said boundaries is defined on the basis of at least a previous one of said reconstructed boundaries.

22. A method as recited in claim 14, wherein said converting further includes a transformation comprising the steps of:
　associating a gradient to each point of a critical contour;
　selecting acquisition lines among said acquisition lines in real space, said selected straight lines corresponding to said points of a same critical contour;
　selecting from said selected straight lines a set of lines which belongs to a same plane termed "sectional plane";
　defining sides in real space with the direction of said gradient associated to said acquisition line of said sectional plane;
　associating two half-planes in said sectional plane to said sides in real space, both half-planes being delimited by said acquisition line associated to said gradient; and
　progressively constructing the intersection of a plurality of half-planes, subject to obtaining a locally convex boundary.

* * * * *